(12) United States Patent
Wildes

(10) Patent No.: US 10,727,781 B2
(45) Date of Patent: Jul. 28, 2020

(54) LOW-SLOPED ROOF SOLAR MOUNTING SYSTEMS

(71) Applicant: Ecolibrium Solar, Inc., Athens, OH (US)

(72) Inventor: Brian James Wildes, Boulder, CO (US)

(73) Assignee: Ecolibrium Solar, Inc., Athens, OH (US)

( * ) Notice: Subject to any disclaimer, the term of this patent is extended or adjusted under 35 U.S.C. 154(b) by 1124 days.

(21) Appl. No.: 14/998,193

(22) Filed: Dec. 24, 2015

(65) Prior Publication Data
US 2016/0190979 A1 Jun. 30, 2016

Related U.S. Application Data

(60) Provisional application No. 62/096,624, filed on Dec. 24, 2014.

(51) Int. Cl.
*H02S 20/30* (2014.01)
*H02S 20/24* (2014.01)
(Continued)

(52) U.S. Cl.
CPC .............. *H02S 20/30* (2014.12); *F24S 25/13* (2018.05); *F24S 25/16* (2018.05); *F24S 25/65* (2018.05);
(Continued)

(58) Field of Classification Search
CPC ..... F24S 2025/806; F24S 20/67; H02S 30/10; H02S 20/10; H02S 20/23; Y02E 10/47; Y02B 10/12
See application file for complete search history.

(56) References Cited

U.S. PATENT DOCUMENTS 4,226,256 A * 10/1980 Hawley .................... G12B 9/08
136/244
4,587,951 A * 5/1986 Townsend ............... F24S 23/81
126/605
(Continued)

FOREIGN PATENT DOCUMENTS

DE 202011001411 U1 4/2011
EP 2362161 A1 8/2011
(Continued)

*Primary Examiner* — Daniel J Wiley
(74) *Attorney, Agent, or Firm* — The Law Office of Patrick F. O'Reilly III, LLC

(57) ABSTRACT

A mounting system for supporting a plurality of photovoltaic modules on a support surface, such as a low-sloped roof, is disclosed herein. The mounting system includes a plurality of telescoping tubular members configured to support photovoltaic modules on a support surface, and configured to be adjustably attached to one another so as to accommodate undulations and uneven regions of the support surface, and at least one of the plurality of telescoping tubular members comprising an arched portion so as to accommodate thermal expansion and contraction. In another embodiment, a plurality of strut members are used to support the modules. In yet another embodiment, a plurality of support members adjustably support one or more photovoltaic modules on a support surface so that the one or more photovoltaic modules are capable of passively tilting in response to external forces acting thereon and/or a heat source, such as the sun, acting thereon.

8 Claims, 30 Drawing Sheets

(51) Int. Cl.
*F24S 25/13* (2018.01)
*F24S 25/65* (2018.01)
*F24S 25/16* (2018.01)
*F24S 40/80* (2018.01)
*F24S 25/00* (2018.01)

(52) U.S. Cl.
CPC .............. *F24S 40/80* (2018.05); *H02S 20/24* (2014.12); *F24S 2025/012* (2018.05); *Y02B 10/12* (2013.01); *Y02B 10/20* (2013.01); *Y02E 10/47* (2013.01)

(56) References Cited

U.S. PATENT DOCUMENTS

| | | | |
|---|---|---|---|
| 4,677,248 A | 6/1987 | Lacey | |
| 5,092,939 A | 3/1992 | Nath et al. | |
| 5,125,608 A * | 6/1992 | McMaster | H02S 20/10 248/163.1 |
| 5,746,839 A | 5/1998 | Dinwoodie | |
| 6,105,316 A | 8/2000 | Bottger et al. | |
| 6,148,570 A | 11/2000 | Dinwoodie et al. | |
| 6,331,671 B1 | 12/2001 | Makita et al. | |
| 6,360,491 B1 | 3/2002 | Ullman | |
| 6,672,018 B2 | 1/2004 | Shingleton | |
| D510,315 S | 10/2005 | Shugar et al. | |
| 6,959,517 B2 | 11/2005 | Poddany et al. | |
| D519,444 S | 4/2006 | Mascolo | |
| D547,262 S | 7/2007 | Ullman | |
| D560,605 S | 1/2008 | McClintock et al. | |
| D564,958 S | 3/2008 | Almy et al. | |
| D565,505 S | 4/2008 | Shugar et al. | |
| 7,435,134 B2 | 10/2008 | Lenox | |
| 7,476,832 B2 | 1/2009 | Vendig et al. | |
| D586,737 S | 2/2009 | Shugar et al. | |
| 7,492,120 B2 | 2/2009 | Benn et al. | |
| D598,372 S | 8/2009 | Sasada | |
| 7,780,472 B2 | 8/2010 | Lenox | |
| 7,921,843 B1 | 4/2011 | Rawlings | |
| 8,136,311 B2 | 3/2012 | Liu | |
| 8,191,320 B2 | 6/2012 | Mittan et al. | |
| 8,266,848 B2 | 9/2012 | Miros et al. | |
| 8,276,330 B2 | 10/2012 | Harberts et al. | |
| 8,397,448 B2 | 3/2013 | Brown et al. | |
| 8,424,255 B2 | 4/2013 | Lenox et al. | |
| 8,505,864 B1 | 8/2013 | Taylor et al. | |
| D692,372 S | 10/2013 | Rothschild et al. | |
| 8,567,132 B2 * | 10/2013 | Rothschild | H02S 20/00 52/173.3 |
| 8,635,818 B2 | 1/2014 | Wildes | |
| D713,784 S | 9/2014 | Wildes | |
| 8,844,215 B2 | 9/2014 | Wildes et al. | |
| 8,869,471 B2 | 10/2014 | Wildes et al. | |
| 9,196,755 B2 | 11/2015 | Wildes | |
| 9,249,925 B2 * | 2/2016 | Roensch | H01L 31/042 |
| 9,413,285 B2 | 8/2016 | Wildes et al. | |
| 10,411,643 B2 * | 9/2019 | Smadja | H02S 20/32 |
| 2005/0072456 A1 | 4/2005 | Stevenson et al. | |
| 2005/0166955 A1 | 8/2005 | Nath et al. | |
| 2007/0095388 A1 | 5/2007 | Mergola et al. | |
| 2007/0144575 A1 | 6/2007 | Mascolo et al. | |
| 2007/0151594 A1 | 7/2007 | Mascolo et al. | |
| 2008/0172955 A1 | 7/2008 | McClintock et al. | |
| 2009/0019796 A1 | 1/2009 | Liebendorfer | |
| 2009/0134291 A1 | 5/2009 | Meier et al. | |
| 2009/0242014 A1 | 10/2009 | Leary | |
| 2009/0320904 A1 | 12/2009 | Botkin et al. | |
| 2009/0320905 A1 | 12/2009 | Botkin et al. | |
| 2009/0320906 A1 | 12/2009 | Botkin et al. | |
| 2009/0320907 A1 | 12/2009 | Botkin et al. | |
| 2010/0018571 A1 * | 1/2010 | Placer | H02S 20/23 136/251 |
| 2010/0077679 A1 * | 4/2010 | Sagayama | F24S 25/13 52/173.3 |
| 2010/0089390 A1 | 4/2010 | Miros et al. | |
| 2010/0147359 A1 * | 6/2010 | Harberts | F24S 25/16 136/246 |
| 2010/0154780 A1 | 6/2010 | Linke | |
| 2010/0212714 A1 | 8/2010 | Rothschild et al. | |
| 2010/0219304 A1 | 9/2010 | Miros et al. | |
| 2010/0236542 A1 | 9/2010 | Pierson et al. | |
| 2010/0269428 A1 | 10/2010 | Stancel et al. | |
| 2011/0056536 A1 * | 3/2011 | Meppelink | F24S 25/11 136/244 |
| 2011/0146753 A1 * | 6/2011 | Johnson | H02S 30/10 136/246 |
| 2011/0154774 A1 | 6/2011 | Rawlings | |
| 2011/0179727 A1 | 7/2011 | Liu | |
| 2011/0278411 A1 | 11/2011 | Carbonare et al. | |
| 2012/0031473 A1 | 2/2012 | Chan et al. | |
| 2012/0032045 A1 | 2/2012 | Lallier et al. | |
| 2012/0048351 A1 * | 3/2012 | Rizzo | F24S 25/634 136/251 |
| 2012/0061337 A1 | 3/2012 | Seery et al. | |
| 2012/0090665 A1 * | 4/2012 | Zuritis | H02S 20/10 136/251 |
| 2012/0090666 A1 * | 4/2012 | Rowe | H02G 3/30 136/251 |
| 2012/0125401 A1 * | 5/2012 | DeVillier | H02S 20/30 136/246 |
| 2012/0125869 A1 * | 5/2012 | Abar | H02S 20/30 211/26 |
| 2012/0240489 A1 | 9/2012 | Rivera et al. | |
| 2012/0266944 A1 | 10/2012 | Wildes | |
| 2013/0019925 A1 * | 1/2013 | Britcher | H02S 20/00 136/251 |
| 2013/0032208 A1 | 2/2013 | Walz et al. | |
| 2013/0112248 A1 * | 5/2013 | McPheeters | F16B 2/12 136/251 |
| 2013/0220403 A1 | 8/2013 | Rizzo | |
| 2013/0233364 A1 * | 9/2013 | Hotes | E04H 15/02 135/94 |
| 2013/0276867 A1 | 10/2013 | Wildes et al. | |
| 2013/0319508 A1 * | 12/2013 | Sinclair | H01L 31/042 136/246 |
| 2014/0014158 A1 | 1/2014 | Wildes et al. | |
| 2014/0102996 A1 * | 4/2014 | Pelman | H02S 20/30 211/41.1 |
| 2014/0112705 A1 * | 4/2014 | Yang | F16B 7/00 403/186 |
| 2014/0112706 A1 * | 4/2014 | Ma | F16B 7/00 403/186 |
| 2014/0124018 A1 * | 5/2014 | Goodman | H02S 20/24 136/251 |
| 2015/0040969 A1 | 2/2015 | Wildes | |
| 2015/0115869 A1 * | 4/2015 | Edmunds | H02S 20/00 320/101 |
| 2015/0129517 A1 | 5/2015 | Wildes | |
| 2015/0214883 A1 * | 7/2015 | Tung | H02S 20/10 211/41.1 |
| 2015/0222218 A1 * | 8/2015 | Koyama | H02S 20/20 136/251 |
| 2015/0256120 A1 * | 9/2015 | Anderson | H02S 20/10 136/251 |
| 2015/0330669 A1 * | 11/2015 | Port | E04B 1/38 52/698 |
| 2016/0079912 A1 | 3/2016 | Wildes et al. | |

FOREIGN PATENT DOCUMENTS

| | | |
|---|---|---|
| FR | 2957619 A1 | 9/2011 |
| GB | 801367 A | 4/2011 |
| JP | 07018795 A | 1/1995 |
| JP | 09177272 A | 7/1997 |
| JP | 2001291889 A | 10/2001 |
| JP | 2008214875 A | 9/2008 |
| WO | 2005020290 A2 | 3/2005 |
| WO | 2008/105296 A1 | 9/2008 |
| WO | 2009120923 A2 | 10/2009 |

\* cited by examiner

LOW-SLOPED ROOF SOLAR MOUNTING SYSTEMS

CROSS-REFERENCE TO RELATED APPLICATIONS

This patent application claims priority to, and incorporates by reference in its entirety, U.S. Provisional Patent Application No. 62/096,624, entitled "Low-Sloped Roof Solar Mounting Systems", filed on Dec. 24, 2014.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The field of the present invention generally relates to mounting systems and, more particularly, to solar mounting systems for mounting photovoltaic modules or panels on generally flat surfaces such as, for example, low-sloped building rooftops, or the like.

2. Background

There is a need for a commercial low-sloped roof mounting system that merges the functionality of both modular and rail based systems, combining the advantages of each without the drawbacks. Modular mounting systems are quick to install, can have low part count, low shipping cost, have a low cost of manufacturing, flow with roof undulations and around obstructions, can have standardized engineering that adapts to layout changes, and can have superior thermal compensation. However, modular systems on the market do not have superior performance in wind and seismic situations. Specifically, modular systems have low structural rigidity and therefore low load sharing (i.e., effective load area), which increases the weight required to resist wind loads and increases the attachments required in high wind locations. Lack of interconnection also increases the number of attachments required to resist seismic forces. Rail-based systems perform well in wind and seismic performance, but are inferior to modular systems in all other aspects noted above. The ideal system is one that is a hybrid of modular and rail-based systems, one that has low part count and installs in a modular way, but once installed is structurally connected to perform like a rail-based system.

The design challenges to accomplish this hybrid system are mainly dealing with roof undulations and thermal compensation, which are challenges to rail-based systems. Roof undulations are common in low-sloped roofs which can vary in tilt up to 5 degrees to allow for drainage. To deal with roof undulations, the system should flow with the roof in all directions. The challenge is to allow for the system to be installed on uneven surfaces, yet lock the system in place once installed so that it acts as one structural unit. A conflicting requirement with locking the system in place permanently once installed is that the system must also be able to expand and contract with temperature fluctuations. As such, what is needed is a hybrid mounting system for photovoltaic modules that meets the requirements set forth above.

There is also a need for a photovoltaic mounting system with improved ballasting. Standard construction concrete blocks are most commonly used to ballast low sloped photovoltaic (PV) arrays. The problems with this method include cost to manufacture, cost to deploy, longevity, and environmental impact. Concrete blocks have a substantial cost to manufacture and deploy. Some estimate that the cost of material and installation of these blocks add $0.03-$0.04/watt to solar installations, which is 20% of the mounting system cost. Also, concrete blocks may degrade over the 25 year life of the solar system, cracking and disintegrating has been observed. This results in decreased effectiveness of the blocks and creates unwanted deposits on the roof surface. Also, concrete has high embedded energy in the production of cement, a main component. There are some systems on the market that have custom concrete blocks integrated into the system. While these solutions reduce the time and cost required to deploy the blocks, they still have issues of cost to manufacture, longevity concerns, and environmental impact.

Thus, what is needed is a mounting system that obviates the need for concrete ballast blocks to avoid all the issues with concrete blocks discussed above. This can be accomplished by either removing the need for weight altogether (adding structural rigidity, improving aerodynamics, etc.) and/or ballasting with another source of weight. While gravel has been used in solar mounting systems, these systems require installers to buy gravel separately, deliver gravel onto the roof, and fill up containers integrated into the racking system with gravel, all of which are not desirable for installers.

Moreover, there is a need for a photovoltaic mounting system with effective passive means by which to tilt or rotate the photovoltaic modules in the array. In a conventional photovoltaic array, the photovoltaic modules are tilted towards the sun to maximize solar gain, but this tilt increases the wind load and corresponding ballast required to hold modules down. Therefore, the mounting system typically requires ballast and structure to counteract negative wind pressure. Also, snow can build up on the modules. Snow reduces solar gain in the winter and increases the amount of structure needed to support a module.

As such, what is needed is a mounting system that passively changes the module tilt based on the environmental forces. In a wind event, the module would ideally be flat and high off the roof to allow for pressure equalization. In a snow event, the module would have a high tilt to shed snow.

Furthermore, there is a need for a photovoltaic mounting system with simple passive means for tilting or rotating the photovoltaic (PV) modules in the array towards the sun, rather than the employing a complicated active system, such as those on the market today. While tracking systems (i.e., PV mounting systems that follow the sun) are desirable because they increase the amount of electricity produced per panel, their drawbacks typically outweigh this benefit. One drawback is that they are cost prohibitive, comprised of many higher cost components. Also maintenance is required to ensure continual operations, which is costly over the 25 year lifespan of a PV system. As such, there is a need for a PV tracking system that uses fewer low cost components so as to reduce the cost of the system, and requires virtually no maintenance.

BRIEF SUMMARY OF EMBODIMENTS OF THE INVENTION

Accordingly, the present invention is directed to low-sloped roof mounting systems that substantially obviate one or more problems resulting from the limitations and deficiencies of the related art.

In accordance with one or more embodiments of the present invention, there is provided a mounting system for supporting a plurality of photovoltaic modules on a support surface. The mounting system includes a plurality of telescoping tubular members configured to support one or more photovoltaic modules on a support surface, the plurality of telescoping tubular members configured to be adjustably attached to one another so as to accommodate undulations and uneven regions of the support surface, and at least one of the plurality of telescoping tubular members comprising an arched portion so as to accommodate thermal expansion and contraction.

In a further embodiment of the present invention, at least some of the plurality of telescoping tubular members extend in a generally north-south direction of the one or more photovoltaic modules and include the arched portion for accommodating thermal expansion and contraction.

In yet a further embodiment, at least some of the plurality of telescoping tubular members extend in a generally east-west direction of the one or more photovoltaic modules and include the arched portion for accommodating thermal expansion and contraction.

In still a further embodiment, a first portion of the plurality of telescoping tubular members extend in a generally north-south direction of the one or more photovoltaic modules; and wherein a second portion of the plurality of telescoping tubular members extend in a generally east-west direction of the one or more photovoltaic modules, each of the first and second portions of the plurality of telescoping tubular members including one or more of the arched portions for accommodating thermal expansion and contraction.

In yet a further embodiment, at least some of the plurality of telescoping tubular members are configured to attach to mounting holes in the one or more photovoltaic modules, or the at least some of the plurality of telescoping tubular members use one or more clamp members that are capable of being attached anywhere along a peripheral edge of the one or more photovoltaic modules.

In still a further embodiment, one or more of the plurality of telescoping tubular members further comprise a standoff member disposed on a north end of the telescoping tubular member for creating a tilt angle of the one or more photovoltaic modules.

In yet a further embodiment, the mounting system further comprises one or more wind deflector members configured to deflect wind up and over the one or more photovoltaic modules rather than under the one or more photovoltaic modules to reduce wind load.

In still a further embodiment, at least one wind deflector section of the one or more wind deflector members comprises one or more elongate slots and/or a narrowed end portion at a connection location to an adjoining wind deflector section so as to accommodate the undulations and the uneven regions of the support surface and the thermal expansion and contraction.

In yet a further embodiment, each of the plurality of telescoping tubular members comprises an internal cavity disposed therein, one or more of the plurality of telescoping tubular members comprising a ballasting material disposed in the internal cavity thereof for ballasting the one or more photovoltaic modules on the support surface.

In still a further embodiment, the ballasting material comprises at least one of: (i) sand and (ii) gravel.

In yet a further embodiment, the one or more of the plurality of telescoping tubular members are prefilled with the ballasting material prior to being installed in place on the support surface.

In accordance with one or more other embodiments of the present invention, there is provided a mounting system for supporting a plurality of photovoltaic modules on a support surface. The mounting system includes a plurality of strut members configured to support one or more photovoltaic modules on a support surface, the plurality of strut members configured to be rotatably attached to one another so as to accommodate undulations and uneven regions of the support surface.

In a further embodiment of the present invention, at least one of the plurality of strut members comprises a notch disposed in a front end thereof for accommodating attachment to an adjacent one of the plurality of strut members.

In yet a further embodiment, at least one of the plurality of strut members comprises a standoff member disposed on a north end of the strut member for creating a tilt angle of the one or more photovoltaic modules.

In still a further embodiment, at least one of the plurality of strut members comprises an elongate slot extending in a lengthwise direction of the strut member, the elongate slot configured to form a wireway for accommodating one or more electrical wires of the one or more photovoltaic modules.

In accordance with yet one or more other embodiments of the present invention, there is provided a mounting system for supporting a plurality of photovoltaic modules on a support surface. The mounting system includes a plurality of support members arranged in a linkage configuration such that some of the support members are rotatable relative to other ones of the support members, the plurality of support members configured to adjustably support one or more photovoltaic modules on a support surface so that the one or more photovoltaic modules are capable of passively tilting in response to external forces acting thereon.

In a further embodiment of the present invention, the external forces comprise at least one of: (i) wind forces due to an existence of a wind-induced pressure differential between upper and lower surfaces of the one or more photovoltaic modules, and (ii) precipitation forces due to snow loading on the one or more photovoltaic modules.

In yet a further embodiment, the rotatable ones of the support members are configured to decrease a module tilt angle in response to the wind forces so as to reduce a wind load on the one or more photovoltaic modules.

In still a further embodiment, the rotatable ones of the support members are configured to increase a module tilt angle in response to a snow load so as to facilitate an off-loading of snow and an increased melting rate of the snow as result of an increased amount of sunlight striking the snow on the one or more photovoltaic modules due to the module tilt angle being increased.

In accordance with still one or more other embodiments of the present invention, there is provided a mounting system for supporting a plurality of photovoltaic modules on a support surface. The mounting system includes a plurality of support members configured to adjustably support one or more photovoltaic modules on a support surface, one or more of the support members configured to elastically deform in response to a heat source acting thereon such that the one or more photovoltaic modules are capable of passively tilting towards the sun when the one or more of the support members are heated thereby.

In a further embodiment of the present invention, the one or more of the support members comprises a first outer layer, a second outer layer, and an internal insulating layer disposed between the first and second outer layers, each of the first and second outer layers having generally the same coefficient of thermal expansion and/or contraction.

In yet a further embodiment, the one or more of the support members are in the form of a beam.

In still a further embodiment, the one or more of the support members do not comprise any moving parts that require maintenance.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Illustrative embodiments of flat roof solar mounting systems comprising arched telescoping tubes are depicted in FIGS. 1-24. The arched telescoping tubes of these embodiments allow one tube to fit within another. The distance they overlap changes the angle with respect to adjacent panels, allowing for roof undulation(s). Once the system is installed, two telescoping tubes can be locked in place to create a structural system. The arches flex under expansion and contraction to relieve stresses caused by thermal fluctuations.

Referring initially to FIGS. 1-4, it can be seen that, in one illustrative embodiment, telescoping arched tubes 10, 12 may be provided in both the north-south direction and the east-west direction to provide structure in both directions yet compensate for roof undulations and thermal changes. In these figures, telescoping arched tubes 10 are provided in the north-south direction, whereas telescoping arched tubes 12 are provided in the east-west direction. In the embodiment of FIGS. 1-4, the mounting system would be built first, then the photovoltaic (PV) modules 14 would be placed thereon.

Figure 1:
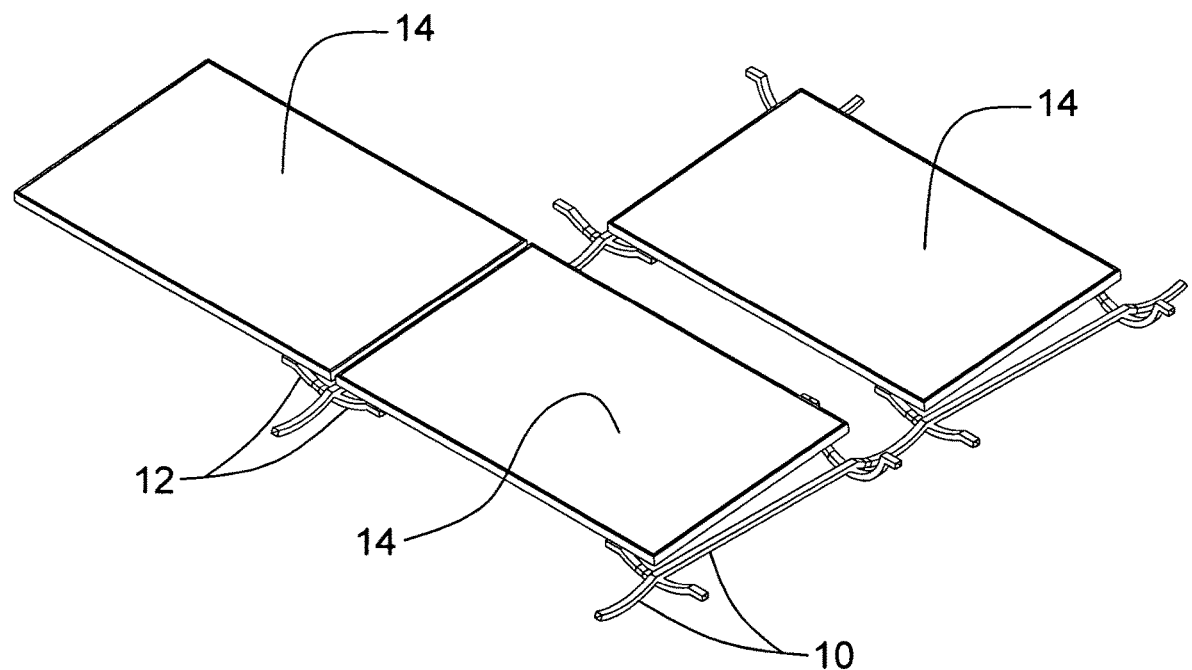
FIG. 1 is a perspective view of a low-sloped roof solar mounting system according to one illustrative embodiment of the invention, wherein telescoping arched tubes are provided in both the north-south direction and the east-west direction.
Figure 2:
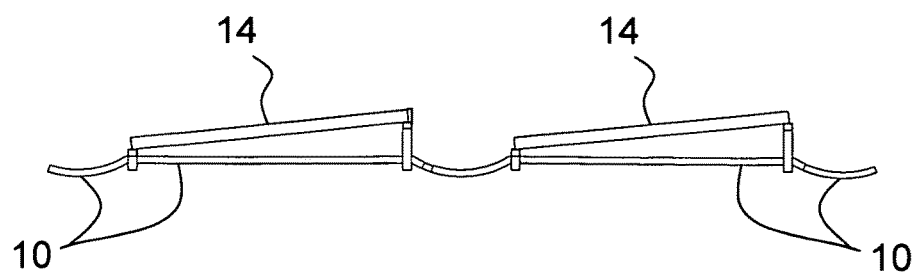
FIG. 2 is a side view of the low-sloped roof solar mounting system of FIG. 1.
Figure 3:
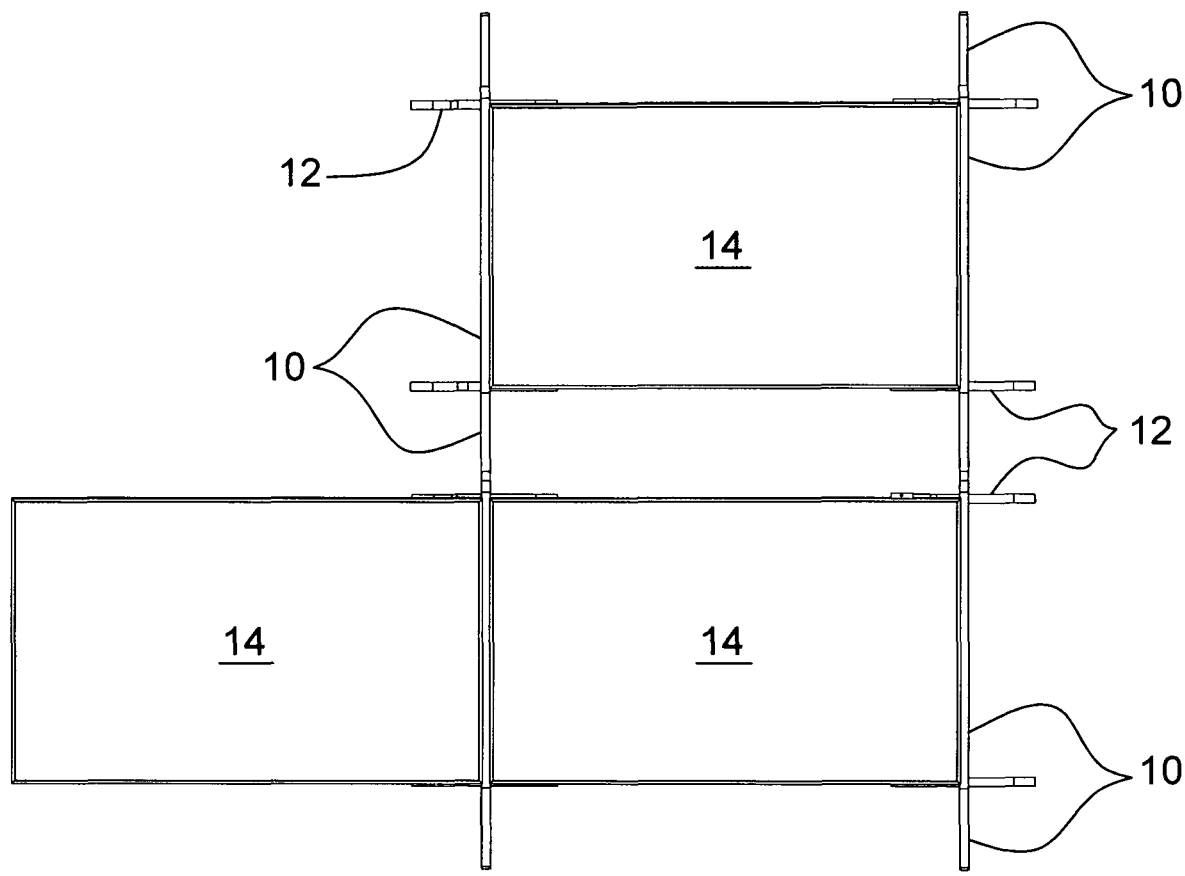
FIG. 3 is a top view of the low-sloped roof solar mounting system of FIG. 1.
Figure 4:
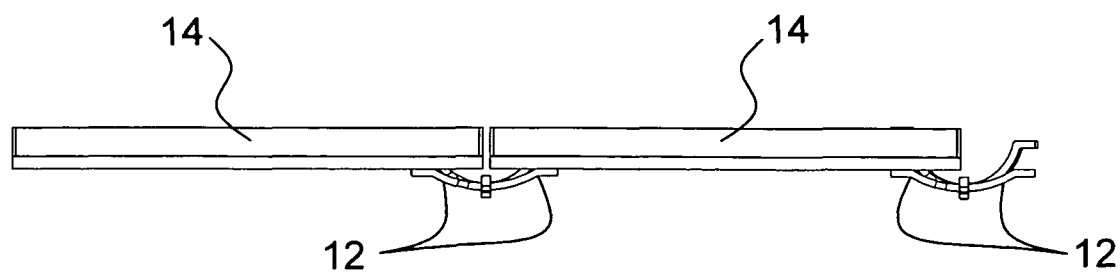
FIG. 4 is a front view of the low-sloped roof solar mounting system of FIG. 1.
Figure 5:
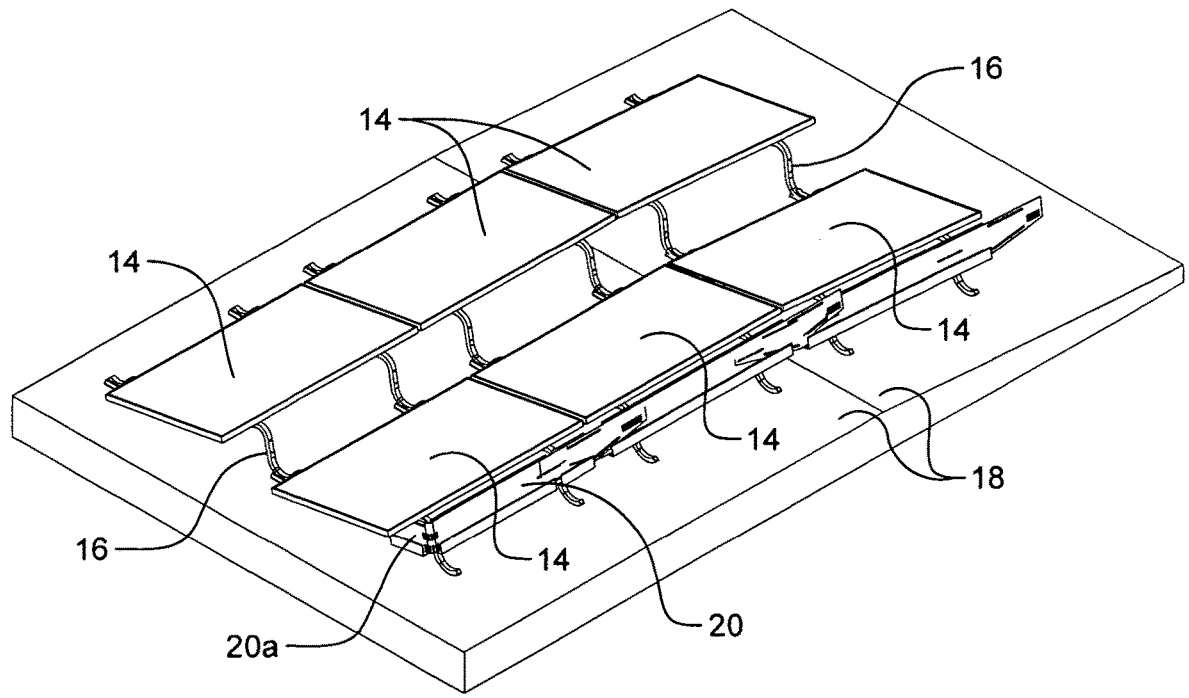
FIG. 5 is a perspective view of a low-sloped roof solar mounting system according to another illustrative embodiment of the invention, wherein telescoping arched tubes are provided in the north-south direction only, and a roof surface that is uneven in the east-west direction is shown.
Figure 6:
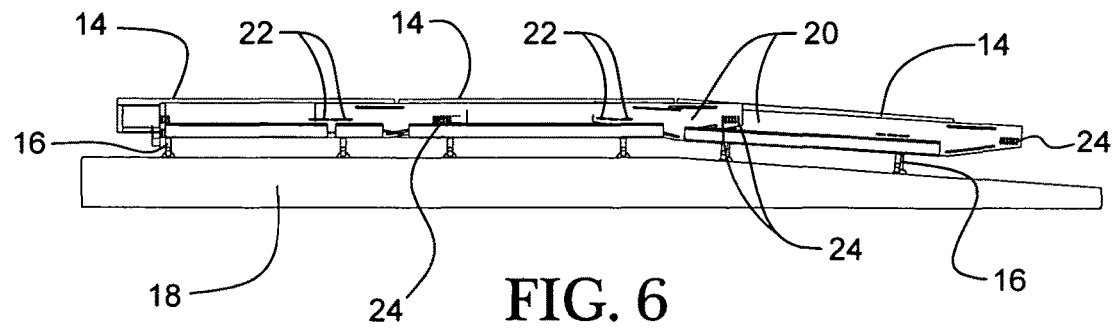
FIG. 6 is a rear view of the low-sloped roof solar mounting system of FIG. 5.
Figure 7:
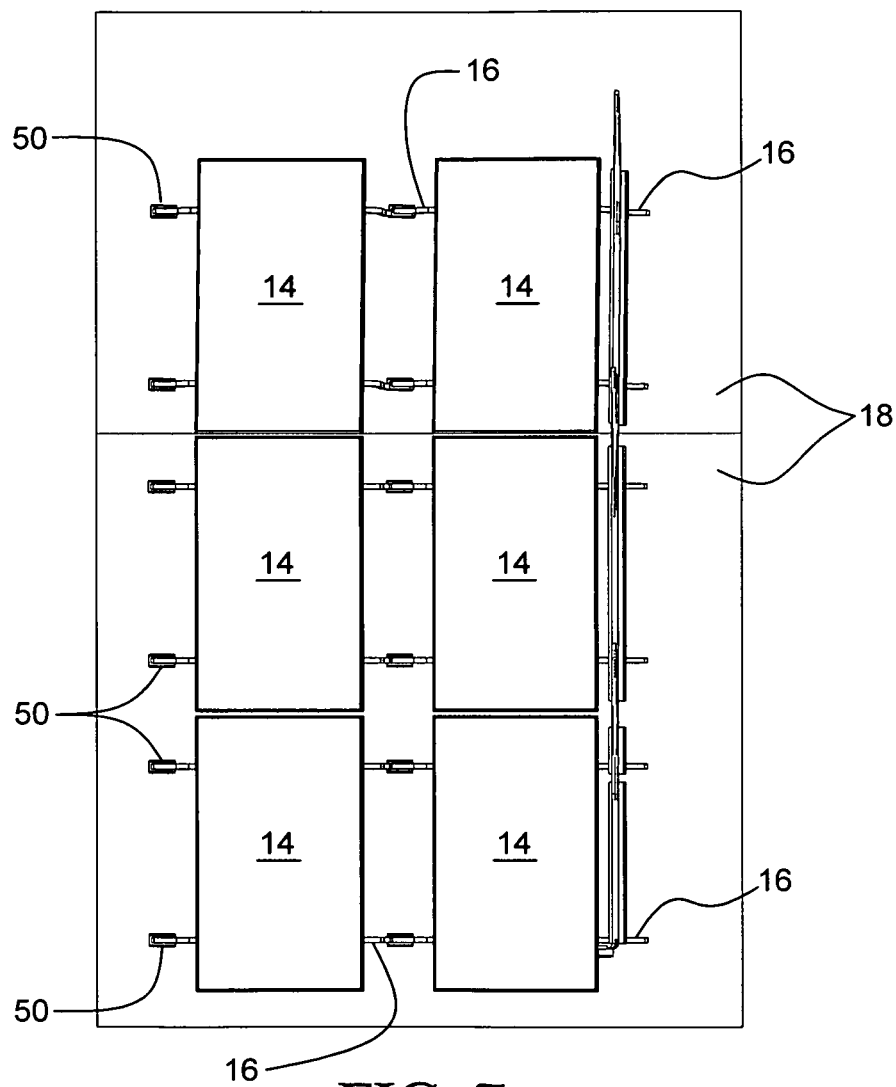
FIG. 7 is a top view of the low-sloped roof solar mounting system of FIG. 5.
Figure 8:
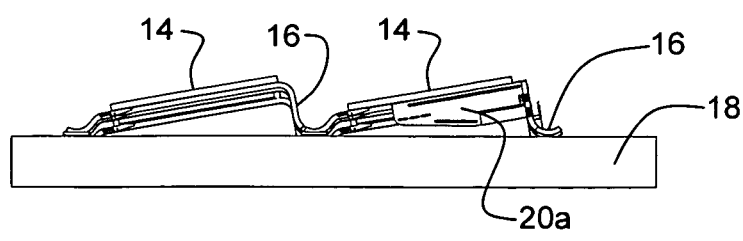
FIG. 8 is a side view of the low-sloped roof solar mounting system of FIG. 5.
Figure 9:
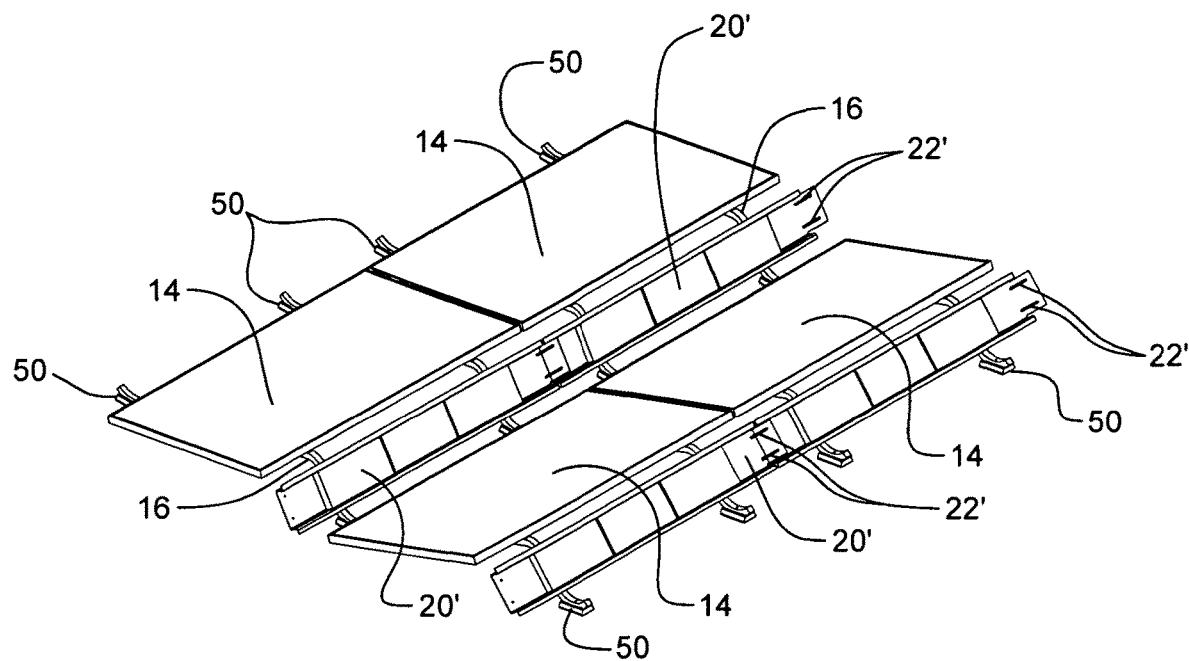
FIG. 9 is a perspective view of a low-sloped roof solar mounting system according to yet another illustrative embodiment of the invention, wherein telescoping arched tubes are provided in the north-south direction only, the mounting system being configured for a roof surface that is uneven in the north-south direction.
Figure 10:
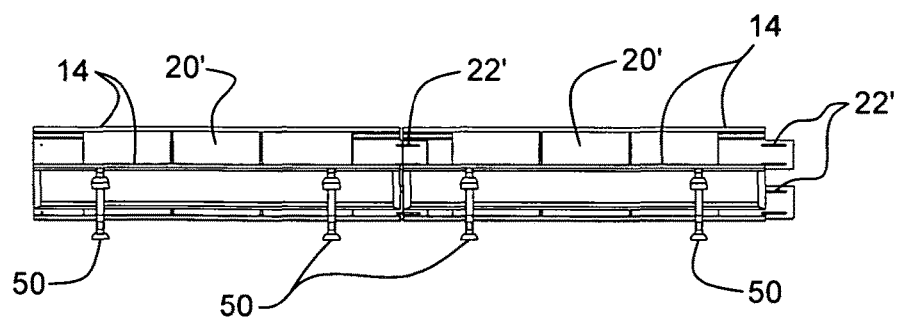
FIG. 10 is a rear view of the low-sloped roof solar mounting system of FIG. 9.
Figure 11:
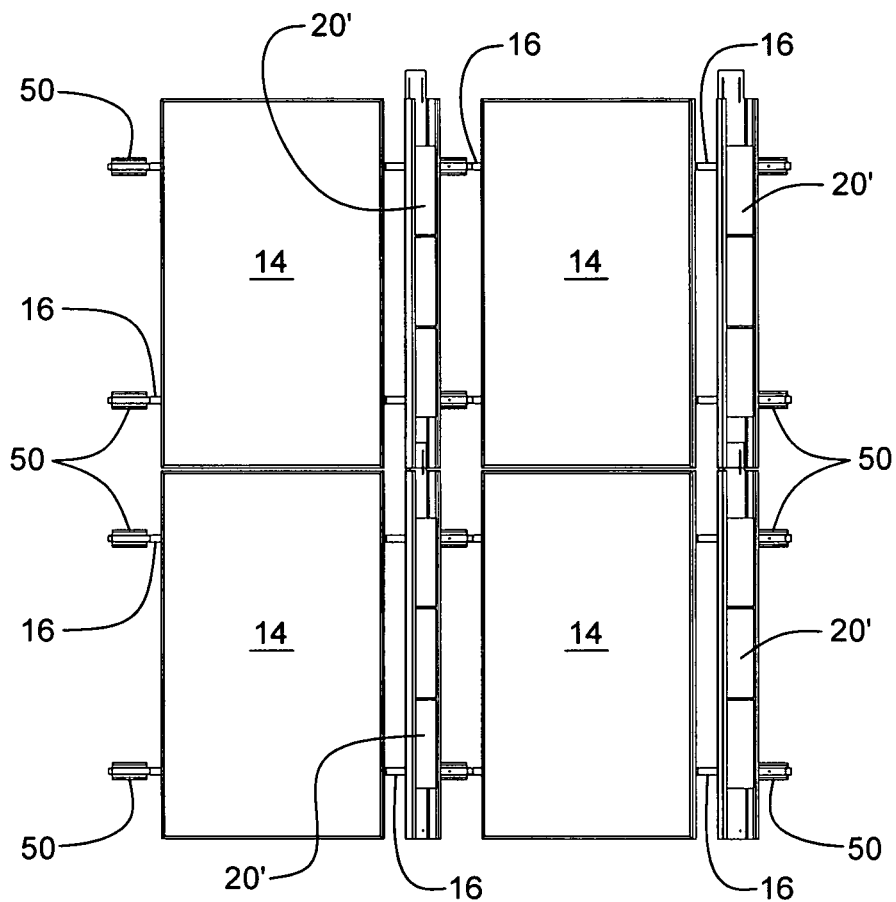
FIG. 11 is a top view of the low-sloped roof solar mounting system of FIG. 9.
Figure 12:
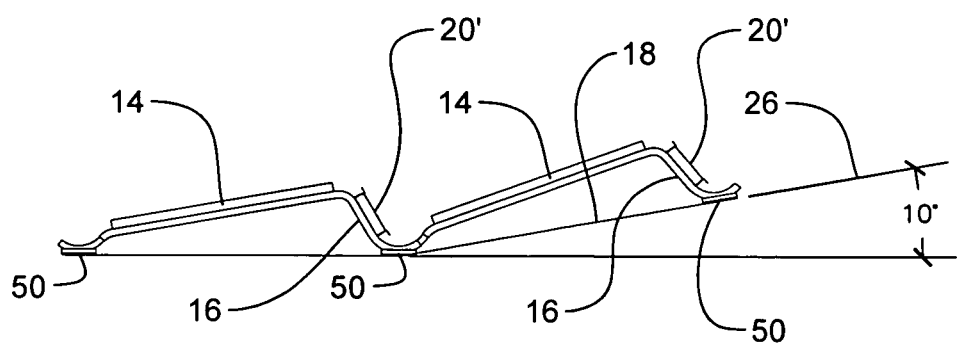
FIG. 12 is a side view of the low-sloped roof solar mounting system of FIG. 9.
Figure 13:
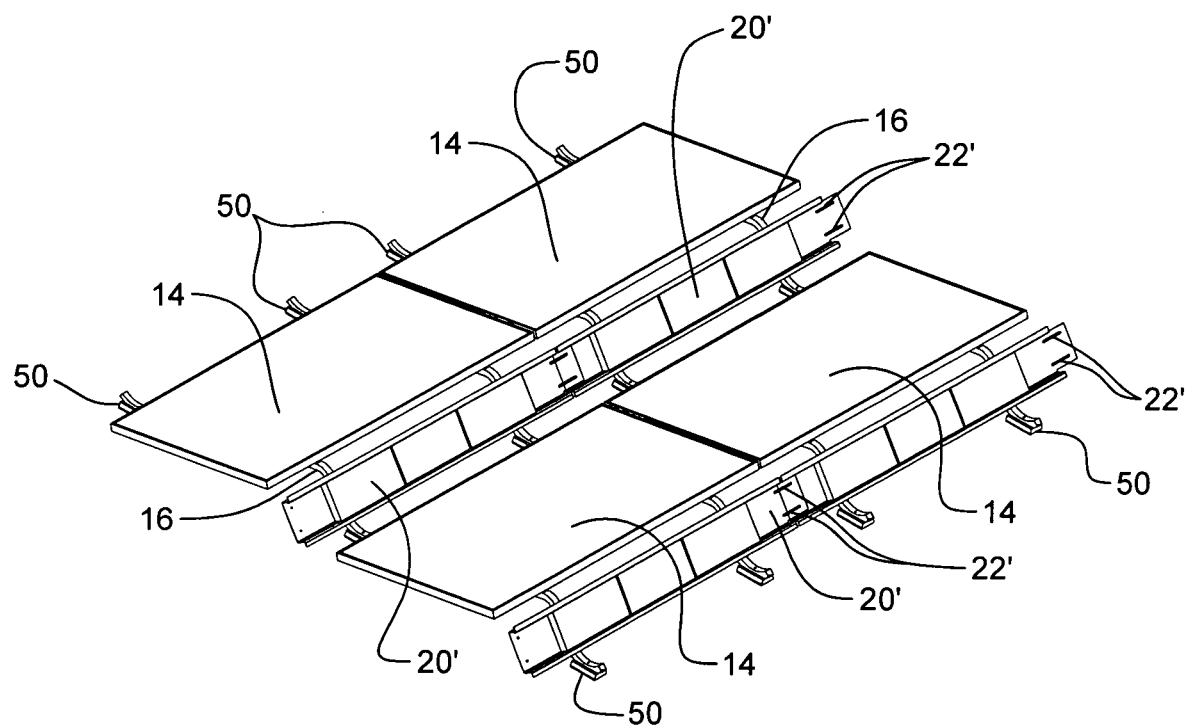
FIG. 13 is another perspective view of the low-sloped roof solar mounting system of FIG. 9, wherein the photovoltaic modules are arranged for mounting on a generally flat roof surface.
Figure 14:
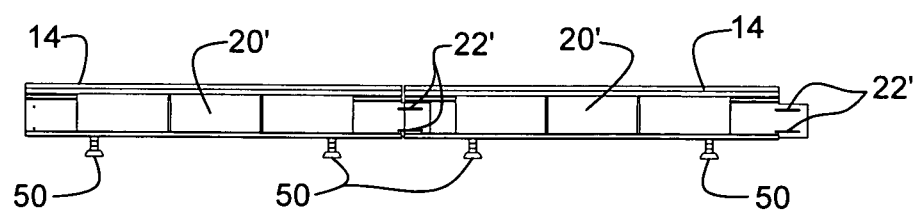
FIG. 14 is a rear view of the low-sloped roof solar mounting system of FIG. 13.
Figure 15:
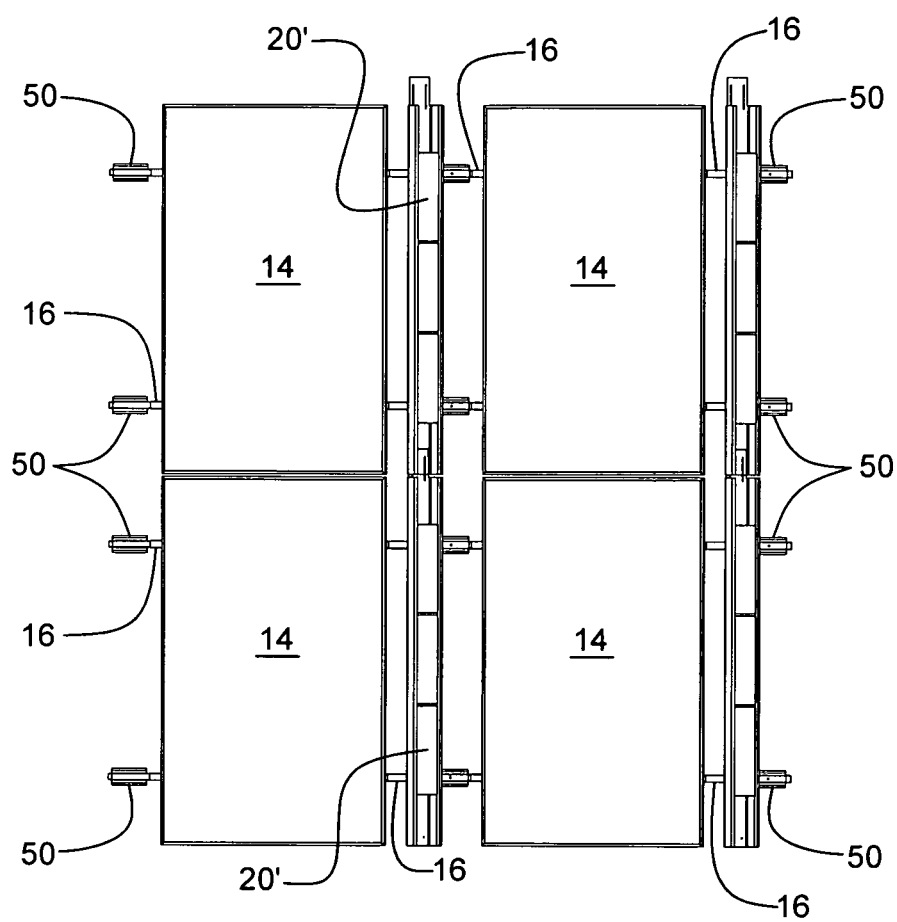
FIG. 15 is a top view of the low-sloped roof solar mounting system of FIG. 13.
Figure 16:
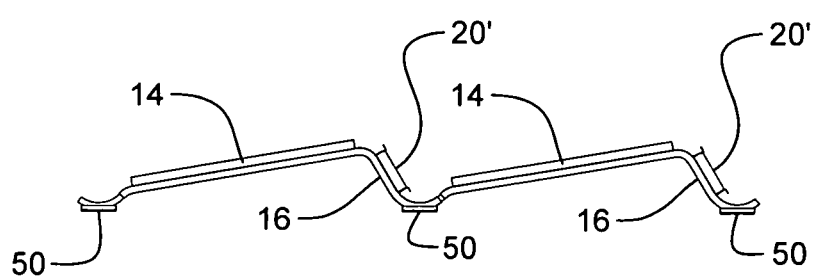
FIG. 16 is a side view of the low-sloped roof solar mounting system of FIG. 13.
Figure 45:
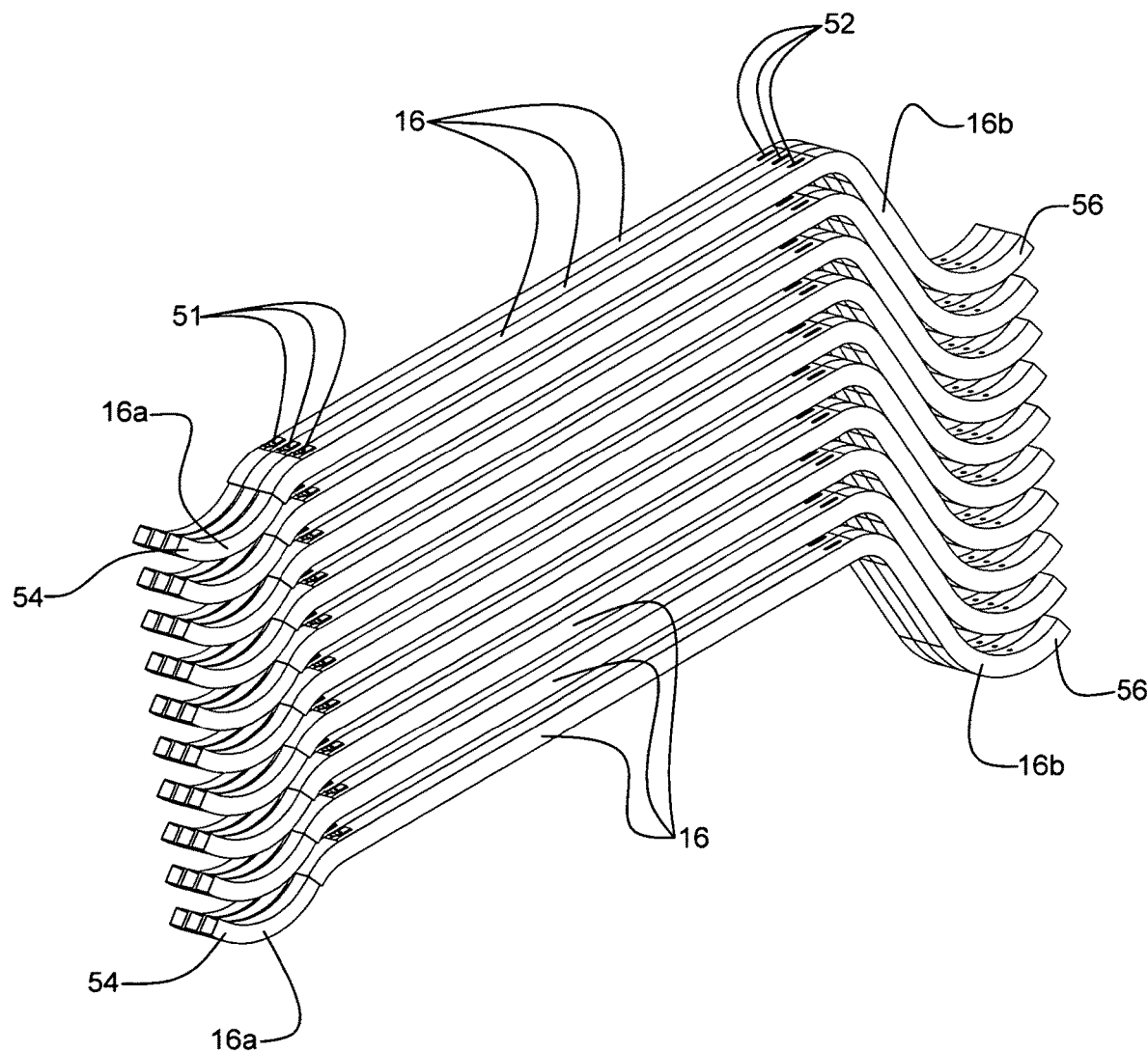
FIG. 45 is a perspective view illustrating the manner in which the telescoping tubular members depicted in FIGS. 5-20 are capable of being stacked.

Next, with reference to FIGS. 5-16, it can be seen that, in another illustrative embodiment, telescoping arched tubes 16 may be provided in the north-south direction of the photovoltaic modules 14 only. In some of these embodiments, the telescoping arched tubes 16 may attach to the mounting holes of the photovoltaic modules 14 using fasteners (e.g., toggle bolts). This mounting arrangement allows the user to install two (2) tubes 16 on a module 14 (see FIGS. 17-20), and then carry the subassembly into place on the roof. For example, referring to FIG. 45, each telescoping arched tube 16 may comprise an elongate slot 52 for accommodating a fastener passing through a mounting hole on a north side of a photovoltaic module 14. The elongate geometry of the slot 52 allows the telescoping arched tube 16 to accommodate different module sizes. Also, as shown in FIG. 45, each telescoping arched tube 16 may comprise a clip member 51 disposed oppositely from the slot 52 to hold the south edge of the photovoltaic module 14 in place. In other ones of these embodiments, the telescoping arched tubes 16 may be provided with clamps that are capable of being attached anywhere along a photovoltaic module frame. In FIGS. 5-8, the building roof 18 is uneven (i.e., sloped) in the east-west direction. In the perspective view of the FIG. 5, it can be seen that the end 20a of the wind deflector 20 tucks under the photovoltaic module 14 to improve aesthetics, and to enhance wind and fire performance. As shown in the rear end view of FIG. 6, the wind deflectors 20 overlap, and the elongate slots 22 extending in the generally east-west direction allows the wind deflectors 20 to slip to relieve stress. Also, as illustrated in FIG. 6, the wind deflectors 20 comprise generally parallel, spaced-apart vertical slots 24 so as to accommodate various roof undulations.

Figure 17:
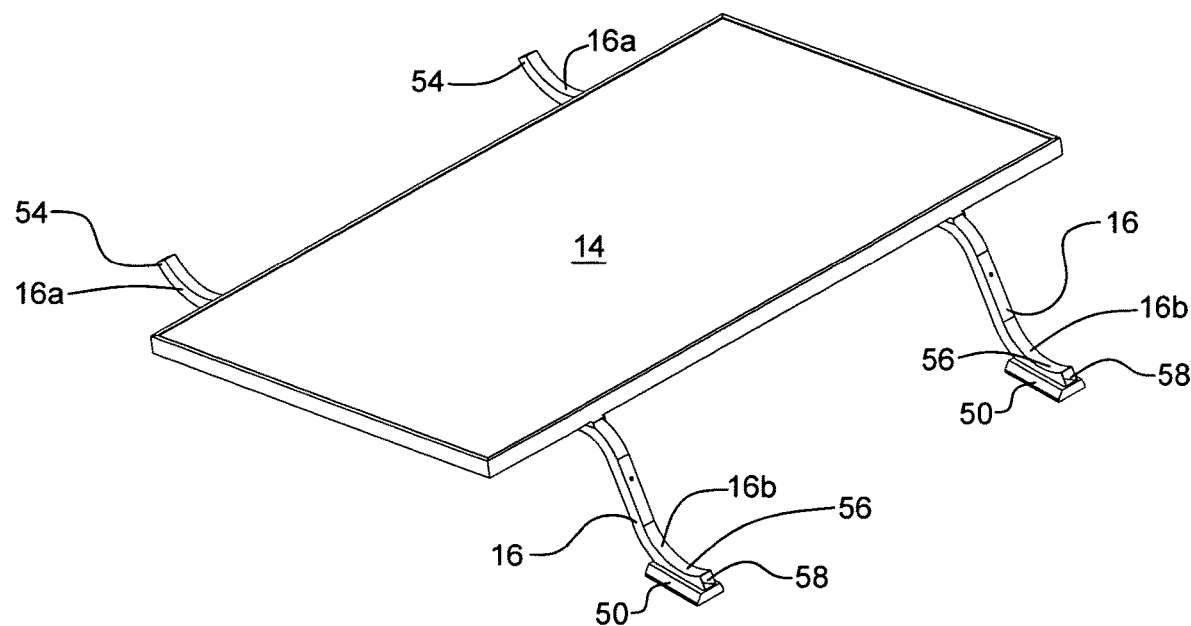
FIG. 17 is a perspective view of a module mounting subassembly of the low-sloped roof solar mounting system of FIGS. 5-16.
Figure 18:
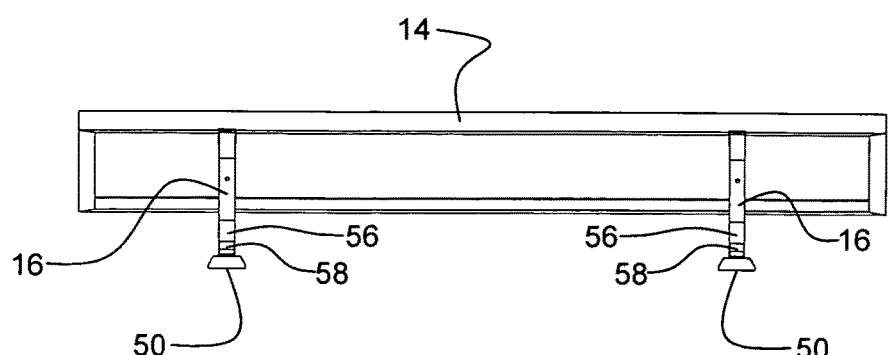
FIG. 18 is a rear view of the module mounting subassembly of FIG. 17.
Figure 19:
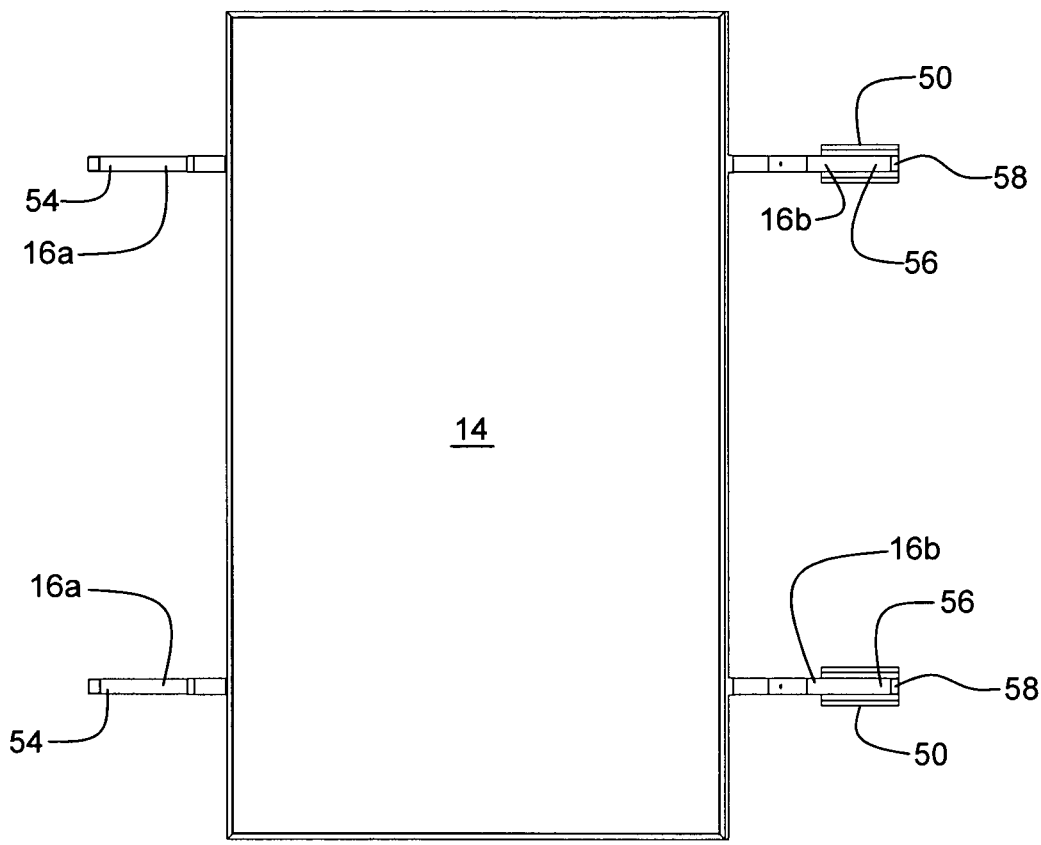
FIG. 19 is a top view of the module mounting subassembly of FIG. 17.
Figure 20:
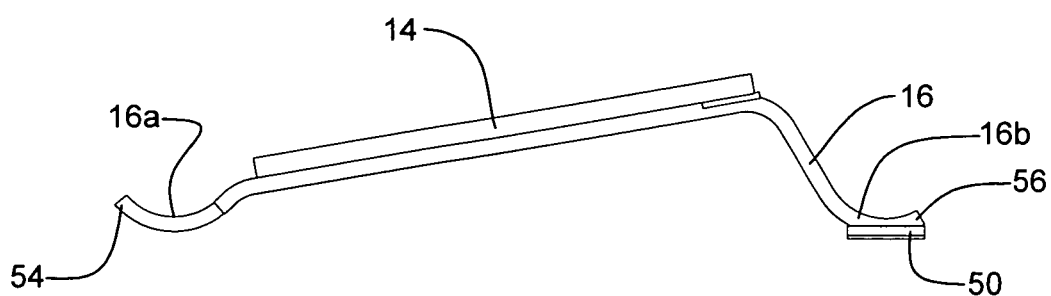
FIG. 20 is a side view of the module mounting subassembly of FIG. 17.
Figure 21:
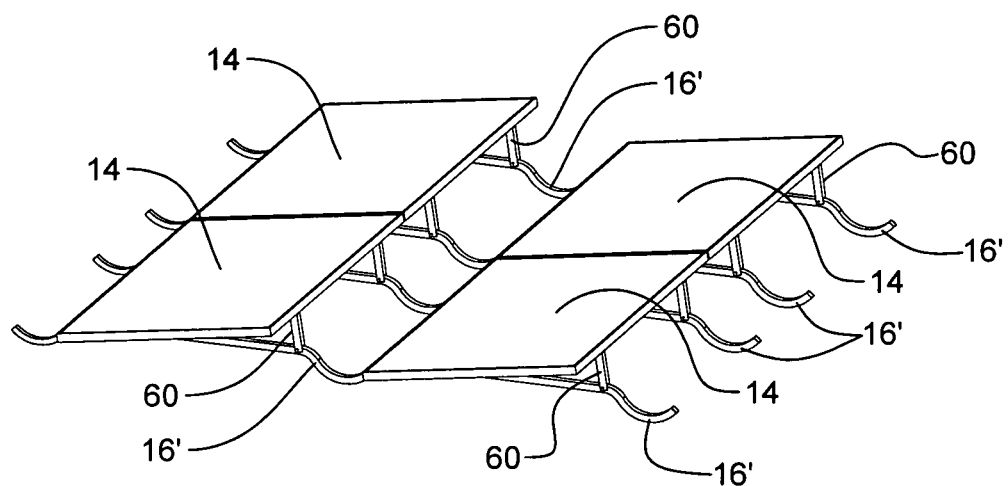
FIG. 21 is a perspective view of a low-sloped roof solar mounting system according to still another illustrative embodiment of the invention, wherein the telescoping arched tubes of the mounting system comprise north end standoffs for creating the photovoltaic module tilt angle.
Figure 22:
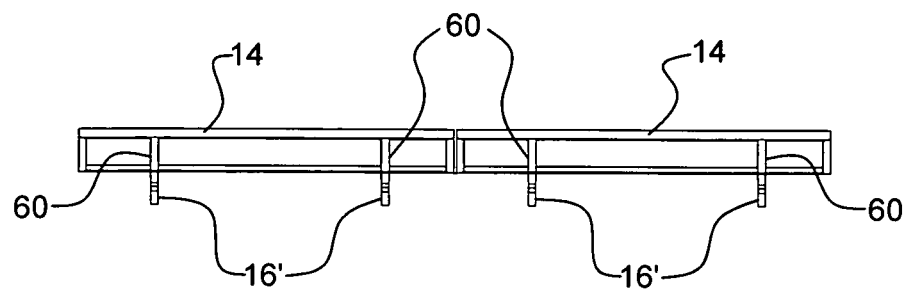
FIG. 22 is a rear view of the low-sloped roof solar mounting system of FIG. 21.
Figure 23:
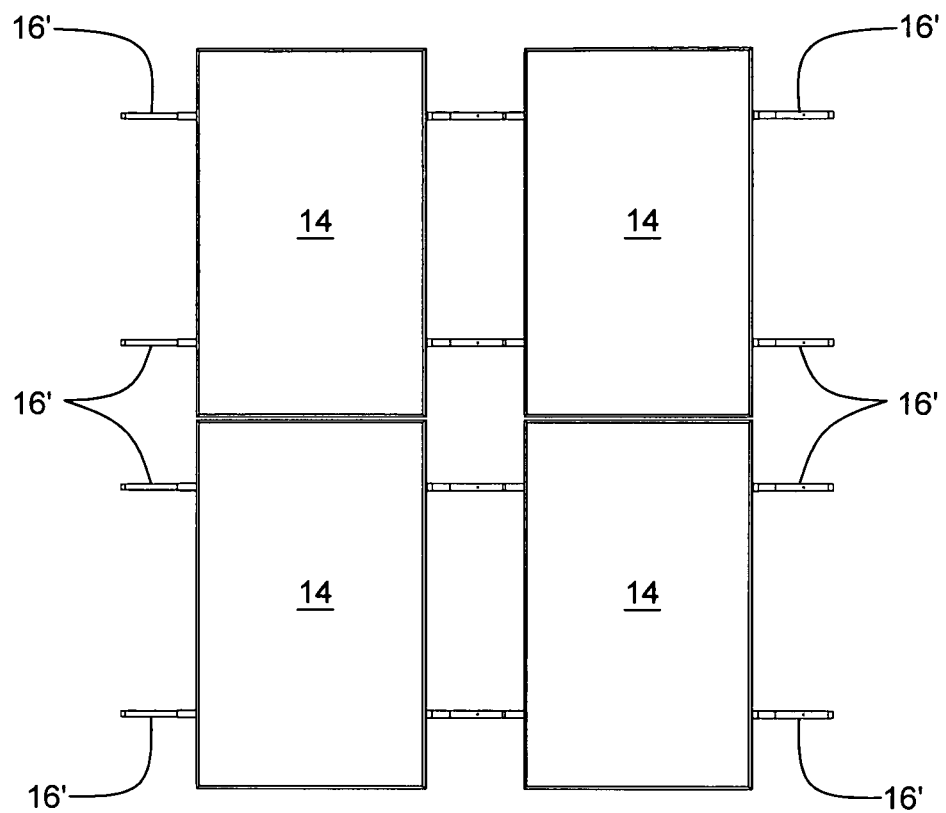
FIG. 23 is a top view of the low-sloped roof solar mounting system of FIG. 21.
Figure 24:
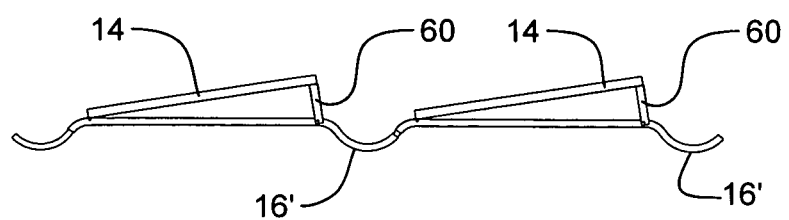
FIG. 24 is a side view of the low-sloped roof solar mounting system of FIG. 21.
Figure 25:
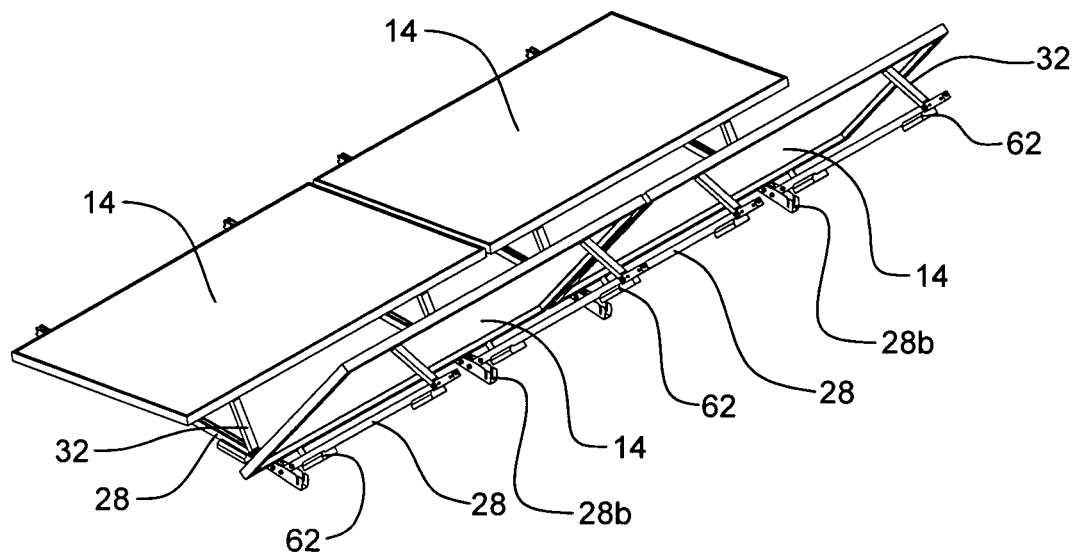
FIG. 25 is a perspective view of a low-sloped roof solar mounting system according to yet another illustrative embodiment of the invention, wherein the mounting system is shown being installed.
Figure 26:
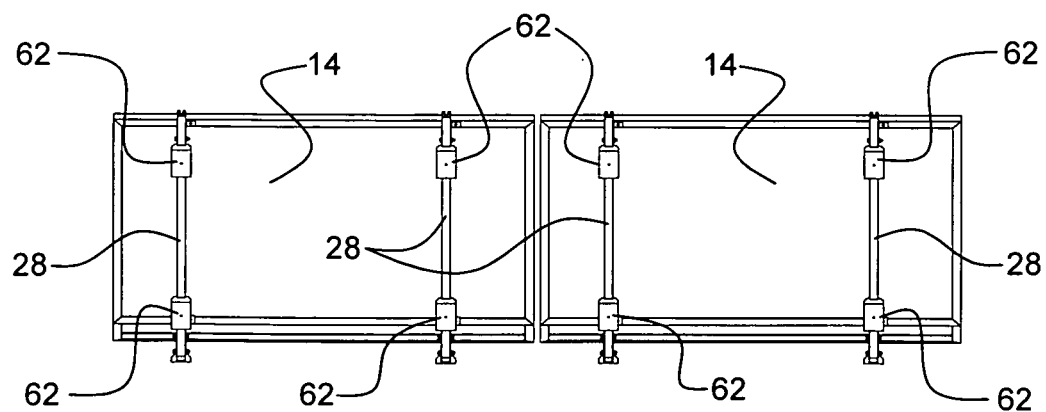
FIG. 26 is a rear view of the low-sloped roof solar mounting system of FIG. 25.
Figure 27:
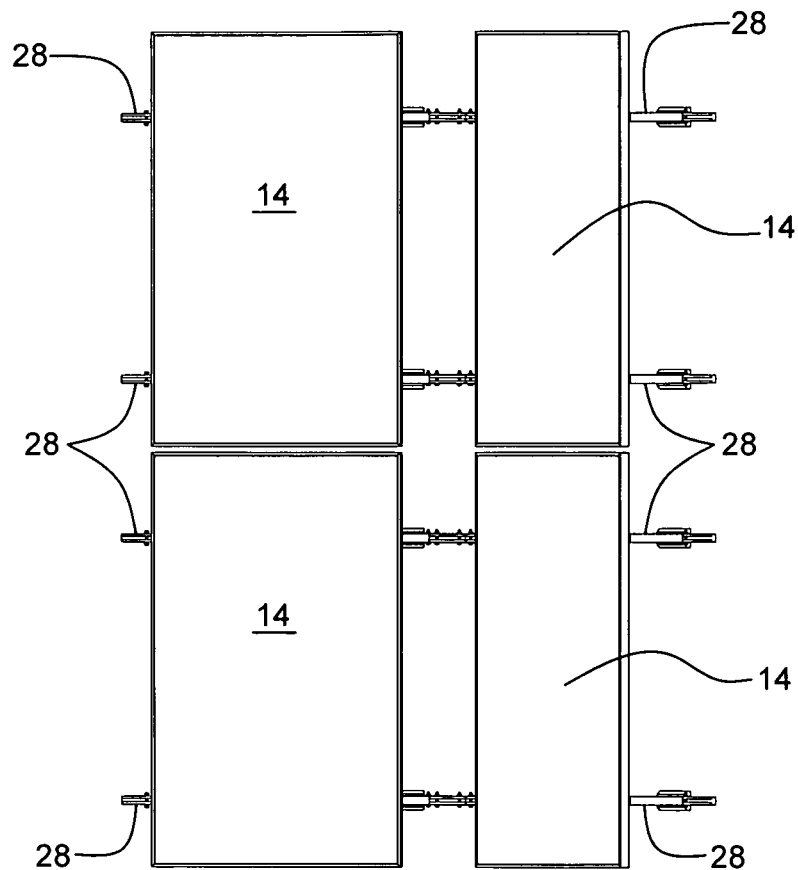
FIG. 27 is a top view of the low-sloped roof solar mounting system of FIG. 25.

As best shown in FIGS. 17 and 20, in the illustrative embodiment, each of the telescoping arched tubes 16 comprises a first curved end portion 16a on a south end of the telescoping arched tube 16 and a second curved end portion 16b on a north end of the telescoping arched tube 16. Advantageously, the arched first and second curved end portions 16a, 16b of the telescoping arched tubes 16 flex under expansion and contraction to relieve stresses caused by thermal fluctuations. Also, as best shown in the side views of FIGS. 12 and 18, the first and second curved end portions 16a, 16b of the telescoping arched tubes 16 may be provided with support feet 50 disposed thereunder to prevent wear on the roof membrane. In an exemplary embodiment, the support feet 50 may be formed from recycled rubber to prevent damage to the roof membrane.

Figure 46:
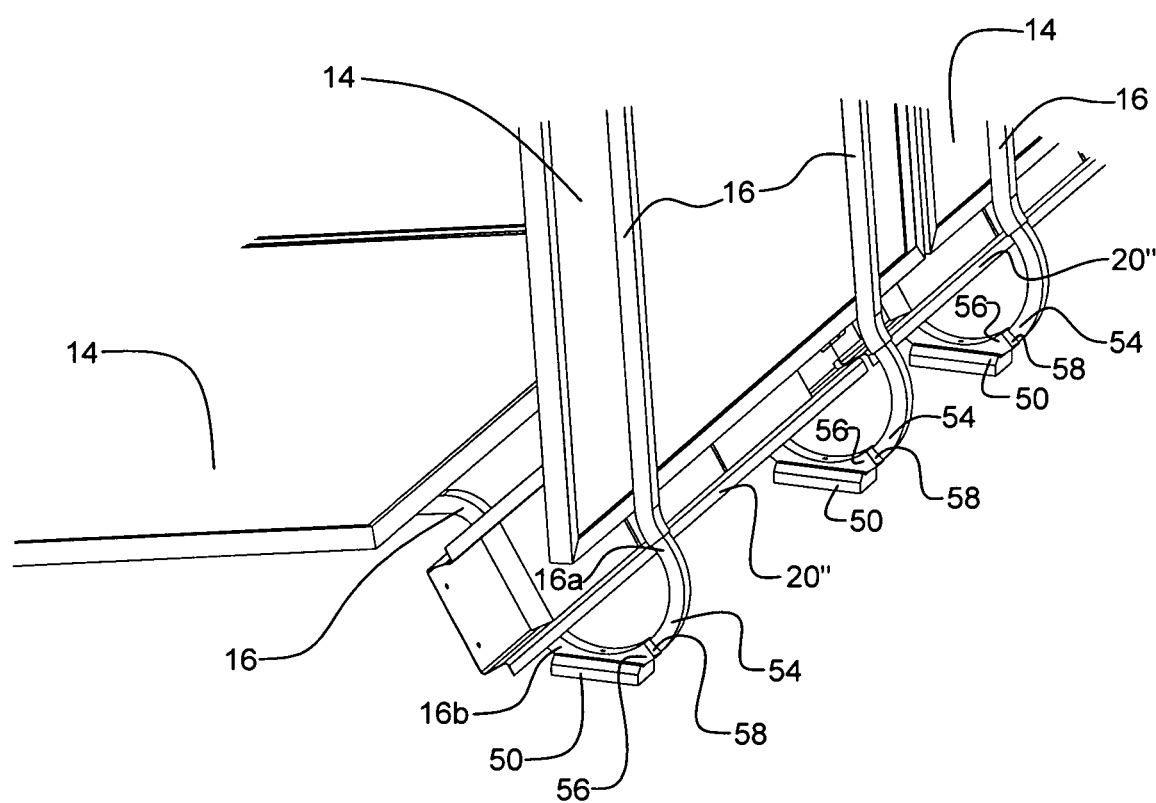
FIG. 46 is an enlarged perspective view illustrating the manner in which the telescoping tubular members depicted in FIGS. 5-20 are capable of being connected to one another.

An enlarged view of the manner in which the telescoping arched tubes 16 are attached together is illustrated in FIG. 46. As shown in FIG. 46, after the telescoping arched tubes 16 are attached to the photovoltaic modules 14 and the deflector 20″ is attached, the photovoltaic module 14 on the north side is tilted upward and the curved portions of the two tubes 16 are placed inside of the curved portions of the tubes 16 of the module 16 to the south. The front end portions 54 of the tubes 16 on the north side module 14 (i.e., the male portions) are formed inward at their ends (i.e., they are inwardly tapered at their ends). The back end portions 56 of the tubes 16 on the south side module 14 are splayed out (i.e., outwardly tapered) so as to form a female portion with a central recess 58 for receiving the male portions 54 of the tubes 16 of the north side module 14. Advantageously, this end portion geometry of the tubes 16 helps to facilitate the insertion of the male portions 54 of the tubes 16 of the north side module 14 into the female portions 56 of the tubes 16 of the south side module 14. Also, the inserted tubes 16 telescope to accommodate north-south roof undulations. In one or more embodiments, once the desired amount of telescoping is obtained, a fastener (e.g., a toggle bolt) may be installed to connect the male and female portions 54, 56 of the tubes 16 together.

In FIGS. 9-12, the mounting system is configured for a building roof 18 that is uneven (i.e., sloped) in the north-south direction. An exemplary ten (10) degree roof slope is shown in the side view of FIG. 12. Although, the mounting system of FIGS. 9-12 can accommodate roof slopes 26 varying by plus or minus ten (10) degrees from a zero (0) degree roof slope. Similar to FIGS. 5-8, the mounting system in the embodiment of FIGS. 9-12 comprises wind deflectors 20' provided thereon. Like the wind deflectors 20, the wind deflectors 20' also comprise elongate horizontal slots 22' extending in the generally east-west direction to accommodate thermal expansion and contraction, as well as east-west roof undulations. However, as shown in the figures, the structure of the wind deflectors 20' of FIGS. 9-12 differ in some respects from the wind deflectors of FIGS. 5-8. The photovoltaic module mounting system depicted in FIGS. 13-16 is generally the same as that depicted in FIGS. 9-12, except that the mounting system is shown in a configuration for a generally flat support surface (i.e., a generally flat roof), rather for a roof having a slope in the north-south direction.

The photovoltaic mounting system of FIGS. 21-24 is similar to that of FIGS. 5-20, except that the telescoping arched tubes 16' in FIGS. 21-24 include north end standoffs 60 that create the tilt angle for the photovoltaic modules 14. Like the mounting systems described above in conjunction with FIGS. 5-20, the telescoping arched tubes 16' of FIGS. 21-24 are only provided in the north-south direction of the photovoltaic modules 14.

Advantageously, as shown in the perspective view of FIG. 45, the telescoping arched tubes 16 may nest and/or stack together for efficient shipping to the jobsite. As a result of their nesting and/or stacking ability, the telescoping arched tubes 16 occupy much less space when being transported to the jobsite (e.g., much smaller shipping containers are required).

Figure 37:
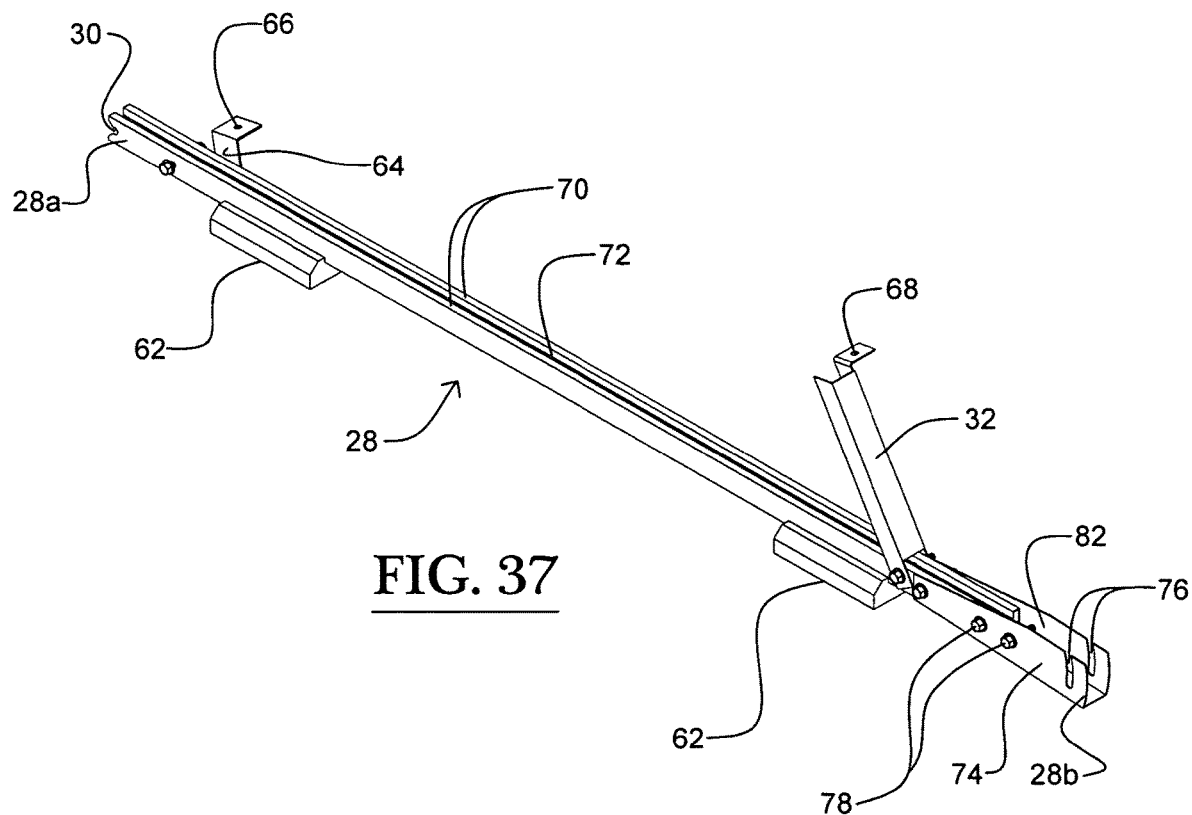
FIG. 37 is a perspective view of a mounting device of the low-sloped roof solar mounting system of FIGS. 29-32.
Figure 38:
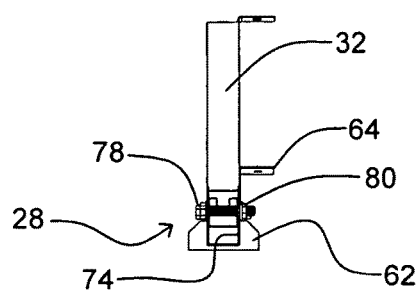
FIG. 38 is a rear view of the mounting device of FIG. 37.
Figure 39:
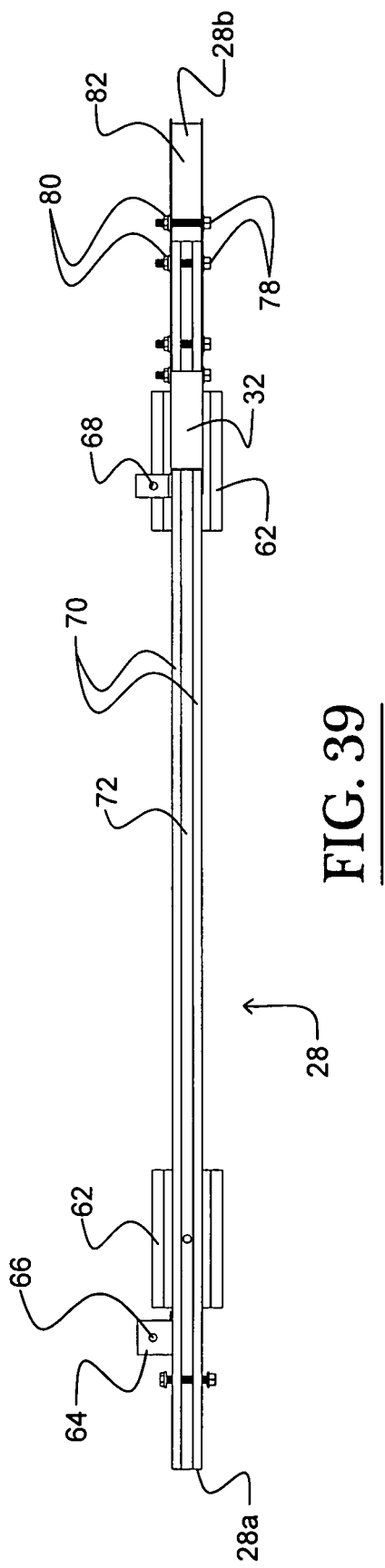
FIG. 39 is a top view of the mounting device of FIG. 37.
Figure 40:
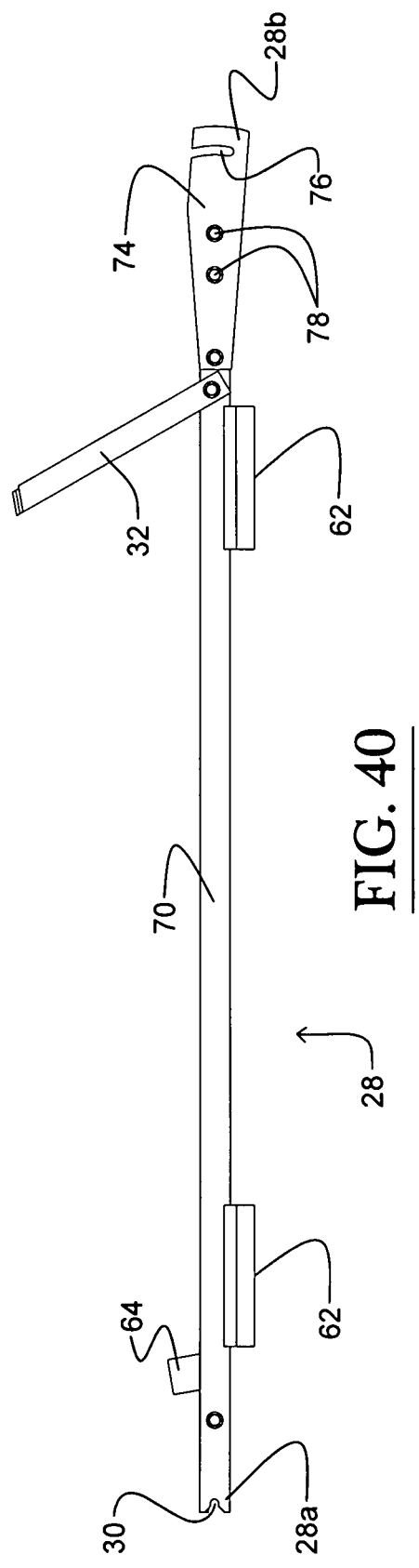
FIG. 40 is a side view of the mounting device of FIG. 37.

The telescoping arched tubes 10, 12 illustrated in FIGS. 1-4, and the telescoping arched tubes 16, 16' illustrated in FIGS. 5-24, operate as mechanisms for connecting rows of photovoltaic (PV) modules 14, which are capable of accommodating uneven roof planes and are capable of providing thermal compensation. FIGS. 25-40 depict another mounting device 28 for connecting rows of photovoltaic (PV) modules 14, which accommodate uneven roof planes and provide thermal compensation. In FIGS. 25-28, the photovoltaic modules 14 are shown being installed using strut-type mounting devices or strut members 28 to connect adjacent rows together. As best shown in the side view of FIG. 28, when the installing the photovoltaic modules 14 on the roof, the installer aligns the notch 30 on the front of the strut member 28 (see FIGS. 33, 36, 37, and 40), and then pivots the photovoltaic module 14 down and into place. In FIGS. 29-32, the mounting system with the strut members 28 is shown in an installed state for a building roof that is uneven (i.e., sloped) in the north-south direction. As shown in the side view of FIG. 32, the mounting system is capable of accommodating roof angles ranging from approximately −10 degrees to approximately +10 degrees. As best shown in FIGS. 37 and 40, the strut members 28 of the mounting system each comprise north end standoffs 32 that create the tilt angle for the photovoltaic modules 14. As best shown in FIG. 37, the north end standoff 32 of the strut member 28 is provided with a mounting hole 68 for receiving a fastener that secures the strut member 28 to the north side of the photovoltaic module 14. Also, as shown in FIG. 37, the strut member 28 is provided with a south end mounting bracket 64 having a mounting hole 66 for receiving a fastener that secures the strut member 28 to the south side of the photovoltaic module 14.

Similar to that described above for the telescoping arched tubes 16, in some embodiments, the strut members 28 may attach to the mounting holes of the photovoltaic modules 14 using fasteners (e.g., toggle bolts). In other embodiments, the strut members 28 may be provided with clamps that are capable of being attached anywhere along a photovoltaic module frame.

Now, with reference primarily to the illustrative embodiment of FIGS. 37-40, the features of each strut member 28 will be described in detail. Each strut member 28 generally comprises a pair of spaced-apart parallel elongate members 70 with a gap or slot 72 disposed therebetween. As illustrated in FIG. 40, the notch 30 is provided in the first end 28a of the strut member 28, while a channel member 74 is provided at the second end 28b of the strut member 28. The channel member 74 is secured to the spaced-apart parallel elongate members 70 by a plurality of fasteners (e.g., bolts 78 with corresponding nuts 80). In FIGS. 37 and 40, it can be seen that the channel member 74 of the strut member 28 is provided with a curved slot 76 disposed therethrough for receiving a fastener that connects the strut member 28 to another strut member 28. The strut channel member 74 has a central recess 82 that receives the first end portion 28a of the adjacent strut member 28 to which it is connected.

Figure 28:
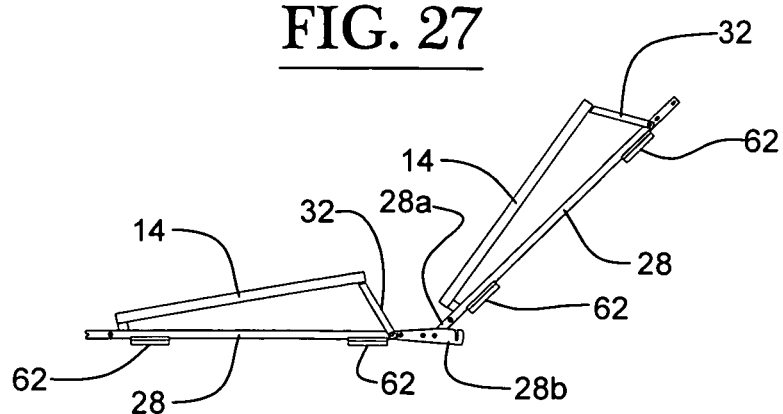
FIG. 28 is a side view of the low-sloped roof solar mounting system of FIG. 25.
Figure 42:
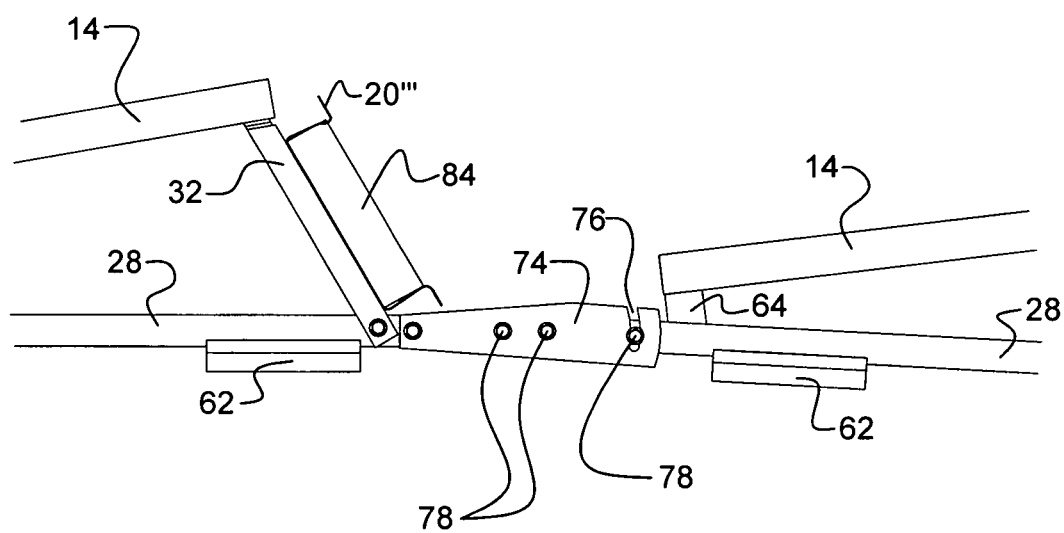
FIG. 42 is an enlarged side view illustrating the manner in which the strut mounting members depicted in FIGS. 25-40 are capable of being connected to one another.

Referring collectively to FIGS. 28 and 42, it can be seen that adjacent strut members 28 may be connected to one another using two fasteners (e.g., the strut splice connection may utilize the two bolts 78 and associated nuts 80). The first of the two fasteners passes through a pair of fastener apertures in the south strut member 28 and engages with the notch 30 in the first end 28a of the north strut member 28 (see FIG. 28). The second of the two fasteners passes through a pair of fastener apertures in the north strut member 28 and engages with the curved slot 76 in the channel member 74 of the north strut member 28 (see FIG. 42). The curved slot 76 is used to allow for north-south movement so as to accommodate north-south expansion and contraction (i.e., the connected strut members 28 are capable of slightly rotating relative to one another). The correct torque is applied to the fasteners 78, 80 to allow this north-south movement while still maintaining the grounding. The engagement between the second fastener and the curved slot 76 of the strut member 28 and the engagement between the notch 30 and the first fastener (i.e., the fork-like first end 28a of the strut member 28 wrapping around the first fastener) provides a means for allowing the system to be adjustable to accommodate north-south roof undulations.

Figure 32:
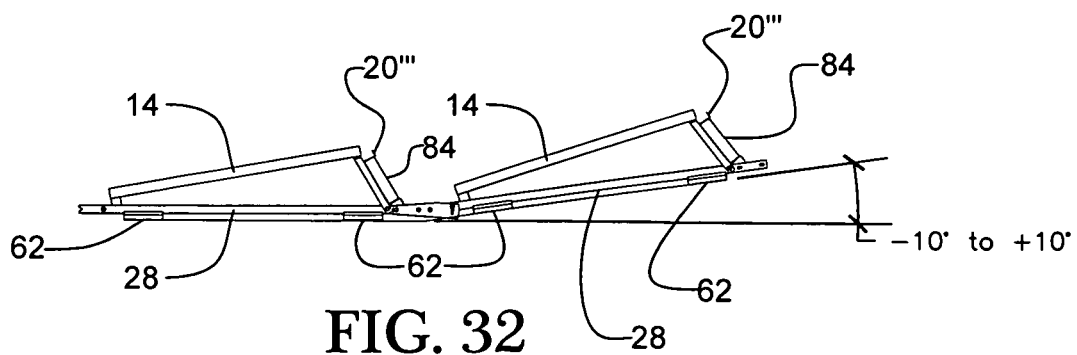
FIG. 32 is a side view of the low-sloped roof solar mounting system of FIG. 29.
Figure 33:
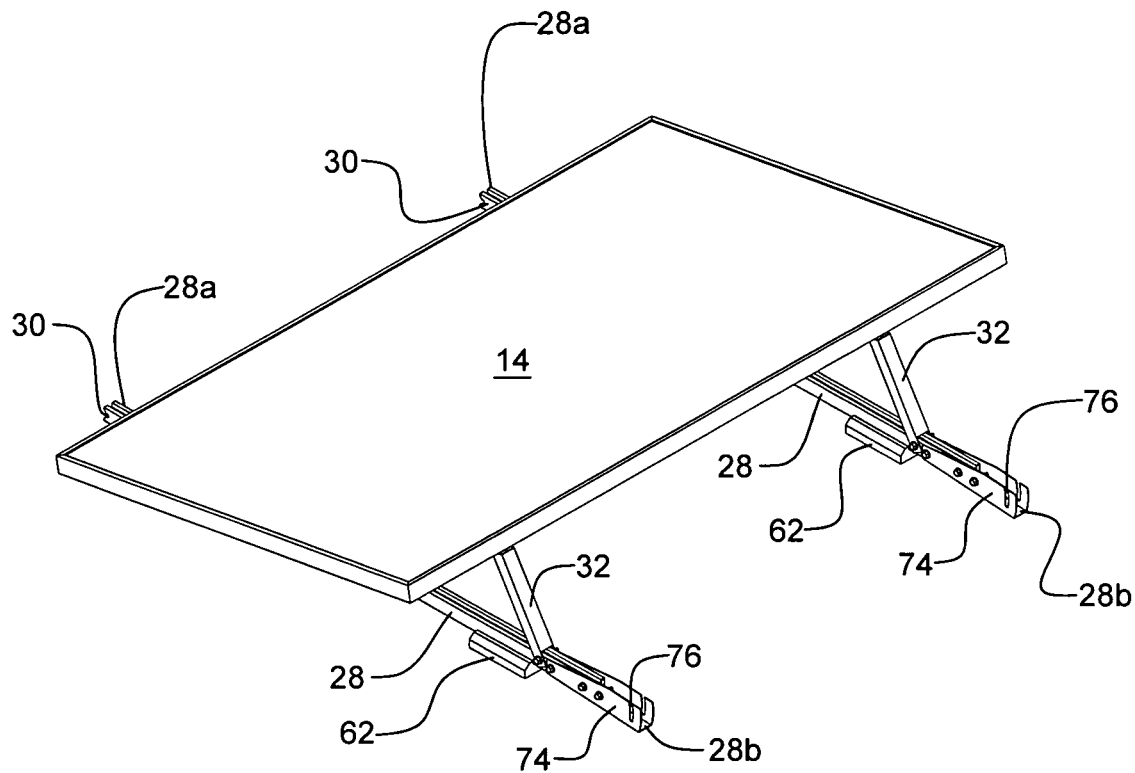
FIG. 33 is a perspective view of a module mounting subassembly of the low-sloped roof solar mounting system of FIGS. 29-32.
Figure 34:
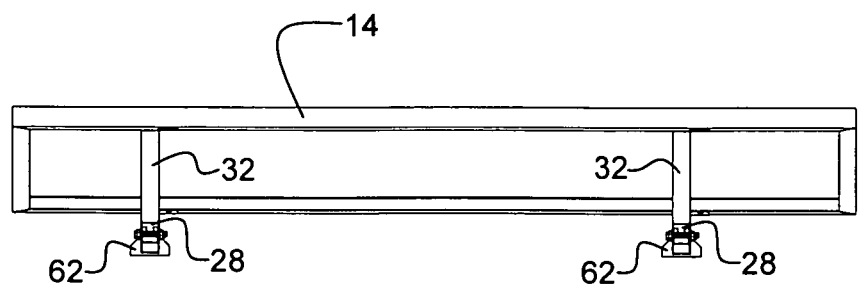
FIG. 34 is a rear view of the module mounting subassembly of FIG. 33.
Figure 35:
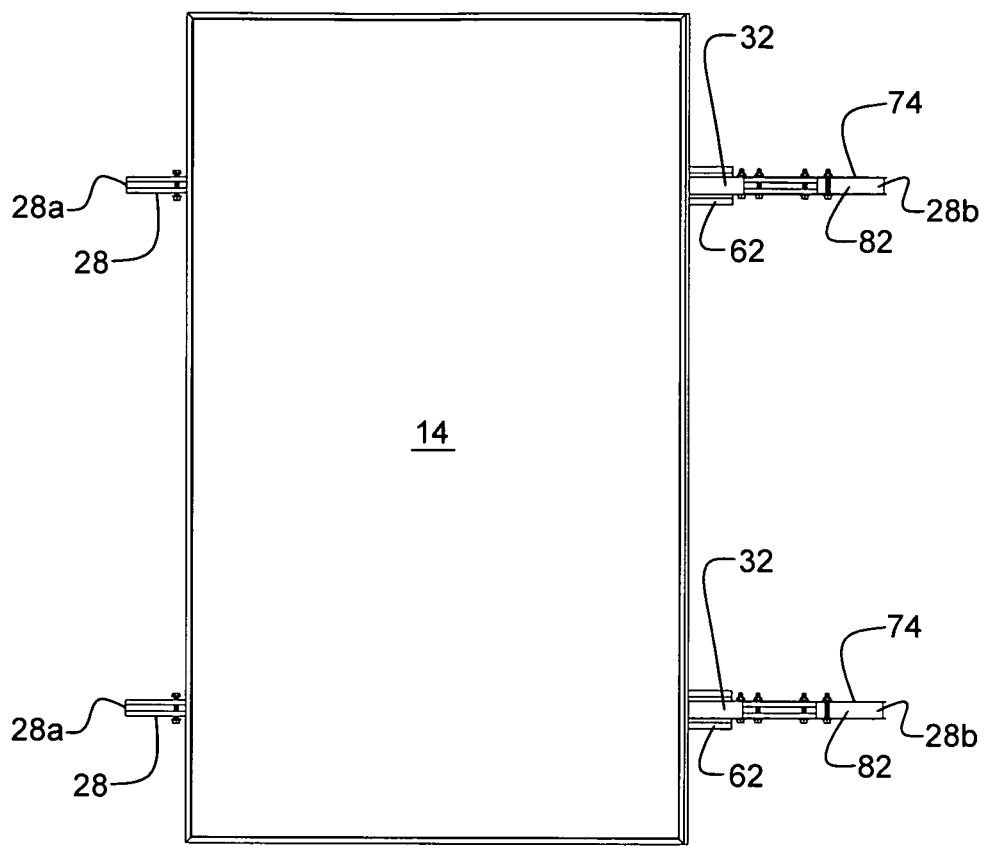
FIG. 35 is a top view of the module mounting subassembly of FIG. 33.
Figure 36:
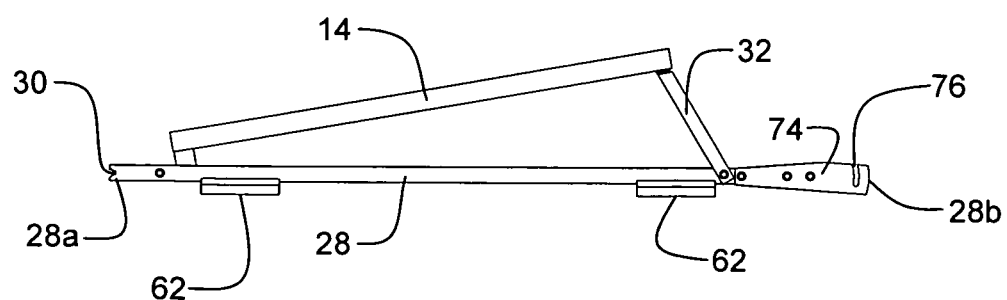
FIG. 36 is a side view of the module mounting subassembly of FIG. 33.

Similar to the telescoping arched tubes 16 described above, the strut members 28 may be provided with support feet 62 disposed thereunder to prevent wear on the roof membrane (see e.g., FIGS. 32, 37, and 42). As described above for the support feet 50 of the telescoping arched tubes 16, in an exemplary embodiment, the support feet 62 may be formed from recycled rubber to prevent damage to the roof membrane.

Figure 41:
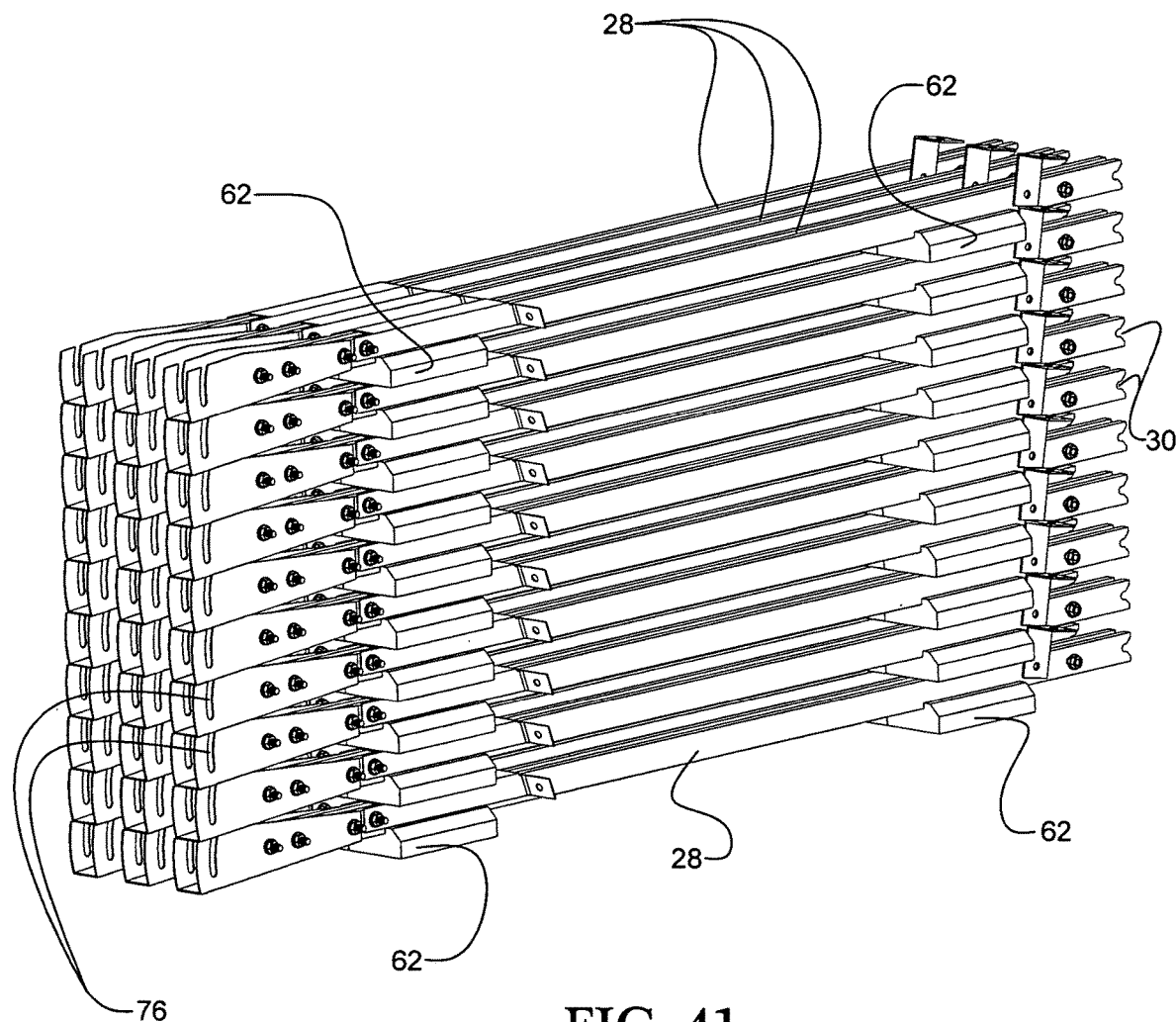
FIG. 41 is a perspective view illustrating the manner in which the strut mounting members depicted in FIGS. 25-40 are capable of being stacked.

Advantageously, as shown in the perspective view of FIG. 41, the strut members 28 may be stacked together for efficient shipping to the jobsite. As a result of their stacking ability, the strut members 28 are capable of being disposed in a compact arrangement, and occupy much less space when being transported to the jobsite (e.g., much smaller shipping containers are required).

Figure 44:
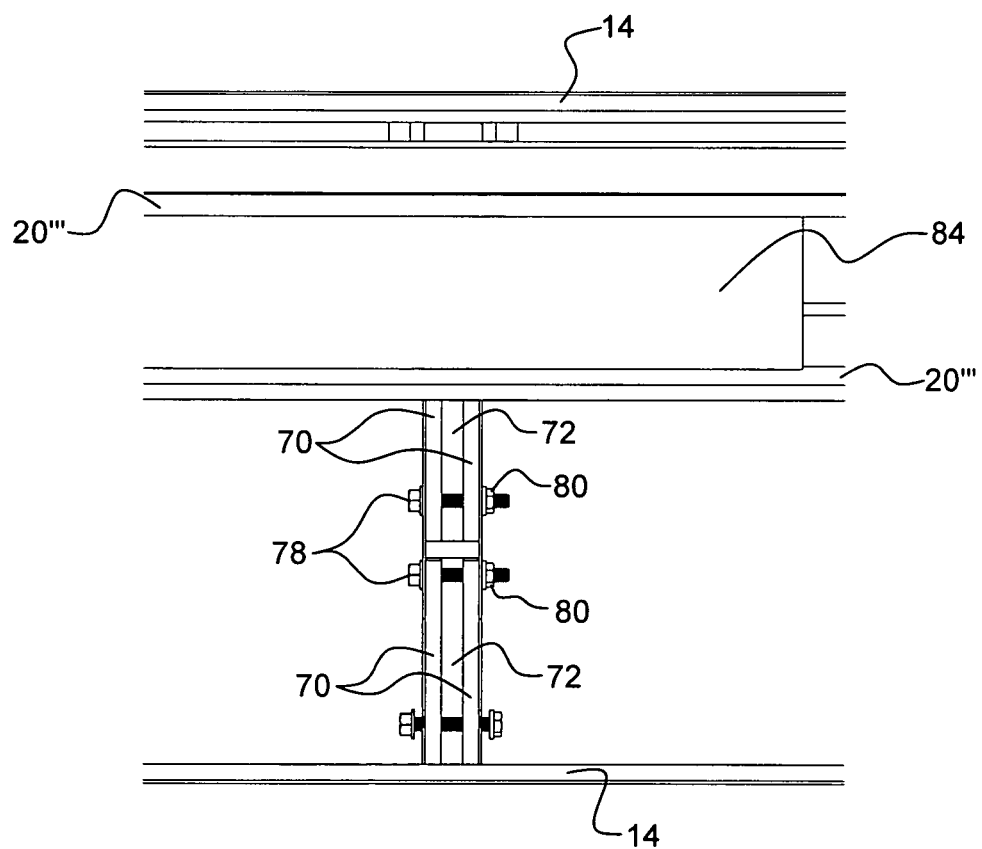
FIG. 44 is an enlarged top view illustrating the wireway formed by the strut mounting members depicted in FIGS. 25-40.

Turning to the enlarged top view of FIG. 44, in the illustrative embodiment, the elongate slot 72, which is formed between the pair of spaced-apart parallel elongate members 70 of the strut member 28, and which extends in a lengthwise direction of the strut member 28, forms a wireway for accommodating one or more electrical wires (e.g., electrical conductors) of the photovoltaic modules 14 to which the strut members 28 are connected. In other words, the elongate slot 72 enables the strut member 28 to be additionally used as a north-south wireway in the photovoltaic module array. The electrical wires (e.g., electrical conductors) of the photovoltaic modules 14 are routed above the fasteners 78 of the strut members 28 (i.e., the electrical conductors can be run on top of the fasteners 78).

In the embodiments of FIGS. 5-8, 9-12, 13-16, and 29-32, using the wind deflectors 20, 20' for structure adds to rigidity without adding part count. Preferably, the photovoltaic module mounting systems also accommodate thermal compensation. One manner in which thermal compensation may be accomplished is shown in FIGS. 5-8. The mounting system of FIGS. 5-8 illustrates one manner in which wind deflectors 20 may be used for adding east-west structural rigidity, yet still provide for thermal compensation and roof undulation.

Figure 29:
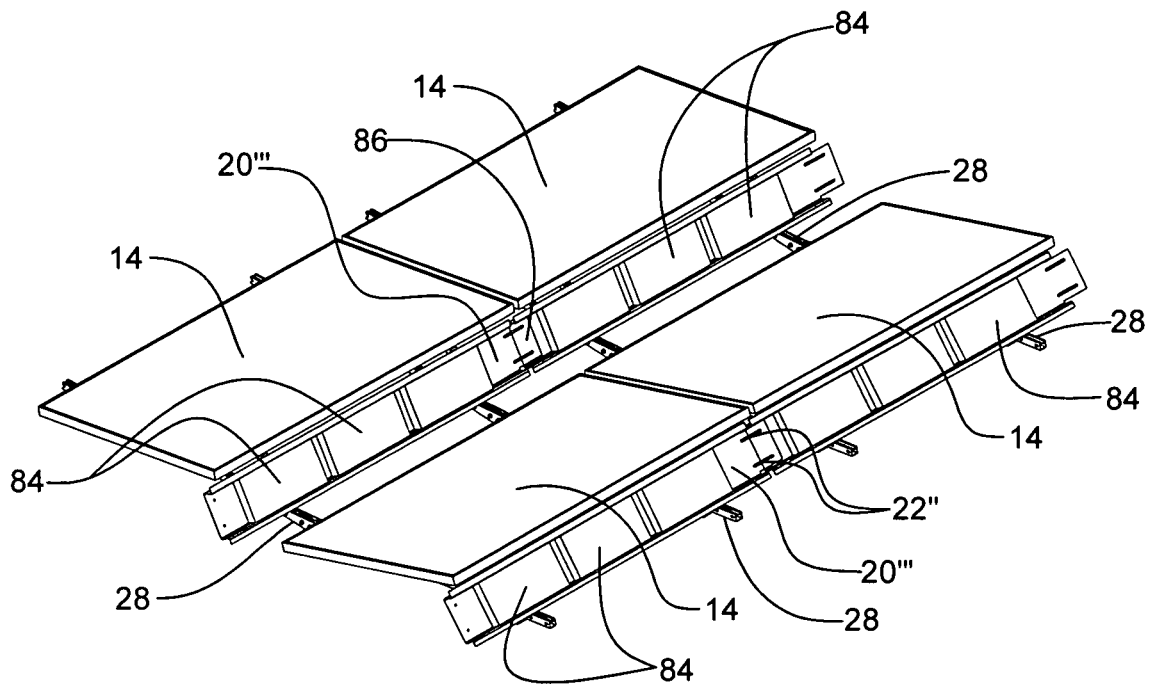
FIG. 29 is a perspective view of a low-sloped roof solar mounting system according to still another illustrative embodiment of the invention, wherein the mounting system is shown in an installed state for a roof surface that is uneven in the north-south direction.
Figure 30:
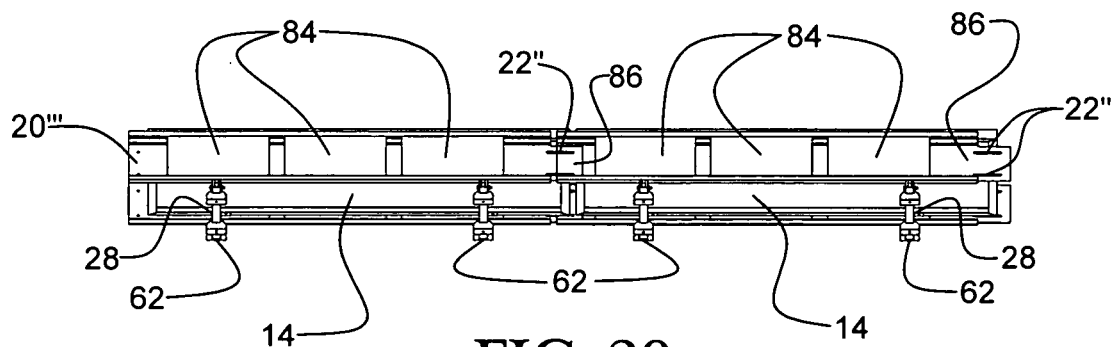
FIG. 30 is a rear view of the low-sloped roof solar mounting system of FIG. 29.
Figure 31:
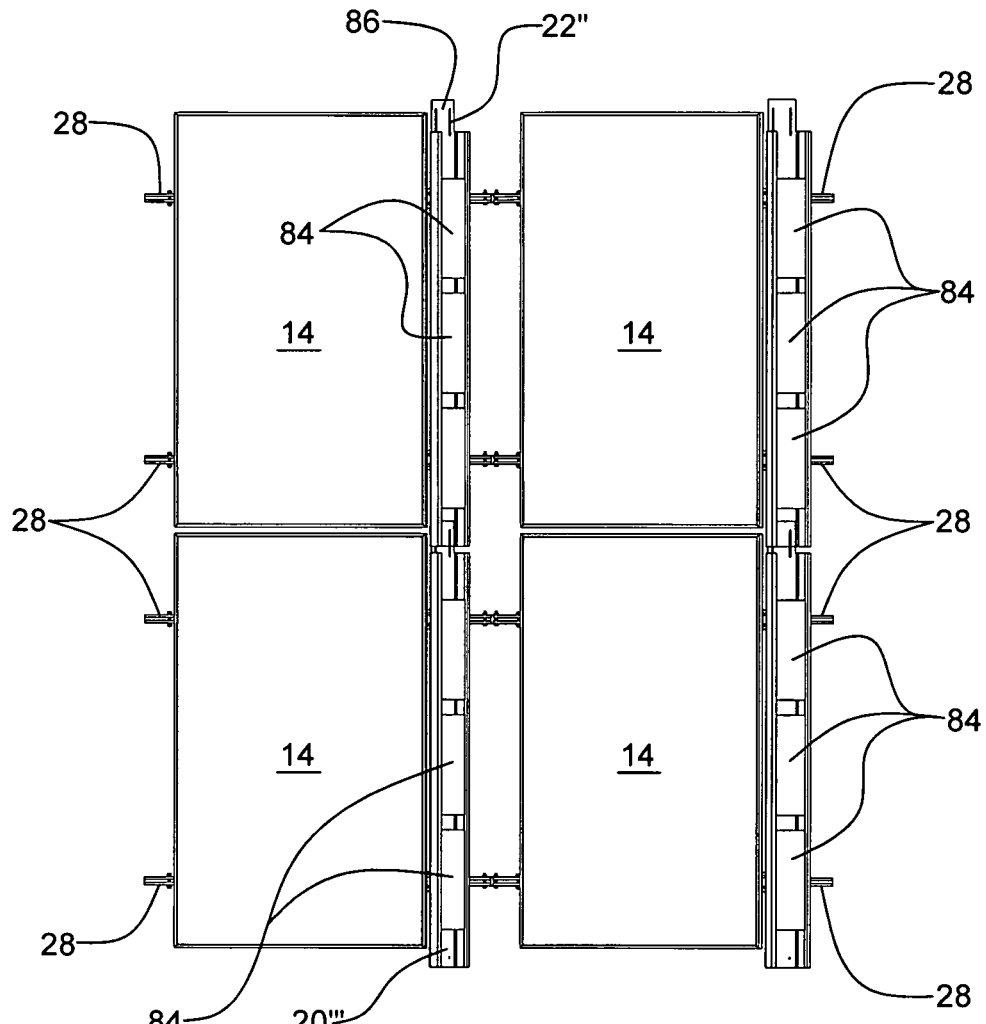
FIG. 31 is a top view of the low-sloped roof solar mounting system of FIG. 29.
Figure 43:
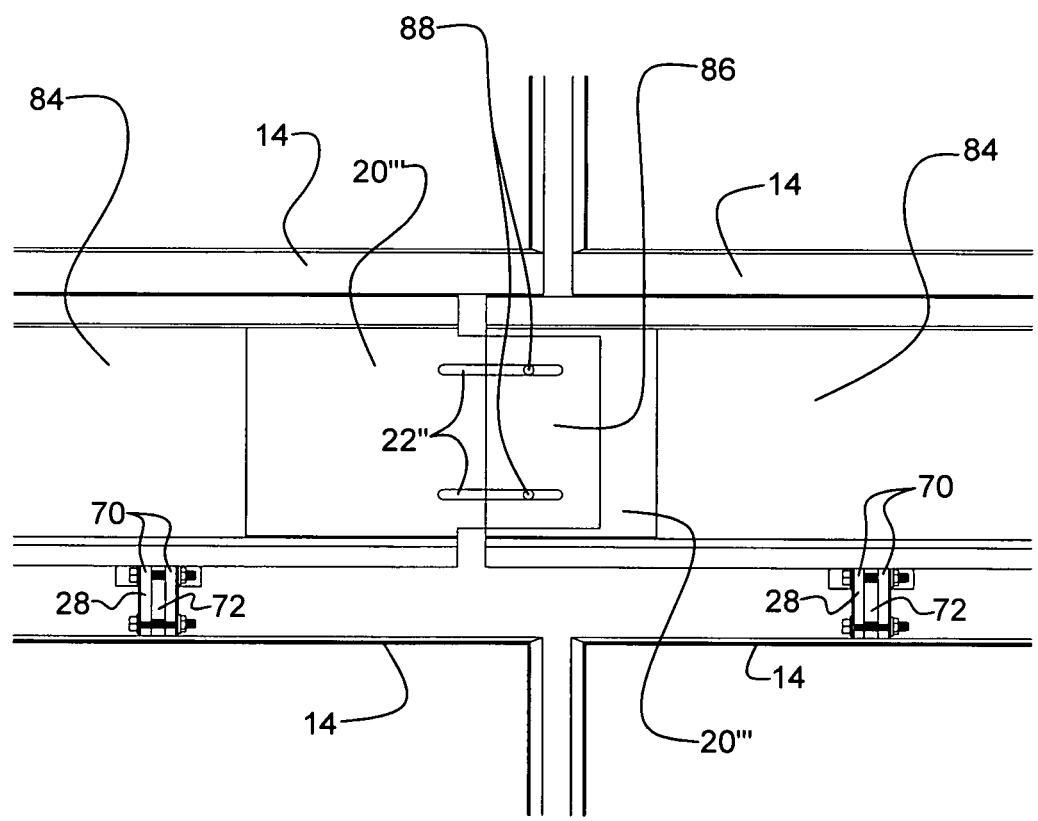
FIG. 43 is an enlarged front view illustrating the manner in which the wind deflector sections of the wind deflectors depicted in FIGS. 29-32 are capable of being connected to one another.

Referring to FIGS. 29-32 and 43, it can be seen that, in the illustrative embodiment, each section of the wind deflectors 20''' may be provided with elongate horizontal slots 22" on one end thereof, which may be used to connect to the next deflector section. These slots 22" allow for east-west expansion and contraction. As shown in FIG. 43, the elongate horizontal slots 22" on one wind deflector section may align with corresponding circular apertures 88 on the other adjoining wind deflector section so that the sections may be joined to one another using fasteners. On the same end as slots 22, as most clearly shown in FIG. 43, the deflector section of wind deflector 20''' may be provided with a narrowed end portion or tongue end portion 86, which is smaller in the vertical direction than the end of the next deflector section to which it is attached. The tongue end portion 86 of the wind deflector 20''' allows the system to adjust for east-east roof undulation by permitting the wind deflector sections to be connected to one another at an angle. Referring to FIG. 29, it can be seen that the wind deflectors 20''' may be in the form of trays with a U-shaped cross-section for accommodating a plurality of ballasts 84 (e.g., concrete blocks) therein. The ballasts 84 provide the photovoltaic module array with extra weight for maintaining stability when the array is subjected to high wind loads.

In one or more embodiments, a mounting system for photovoltaic modules is provided that utilizes alternative ballasting materials and integrates these materials into the system. In one embodiment, the mounting system comprises a plurality of tubes that support photovoltaic modules. These tubes may be filled with sand or gravel prior to being transported to the jobsite. Sand and gravel has a lower cost per weight than concrete, lower embedded energy, and when contained within metal tubes, eliminates longevity concerns. Integrating sand or gravel into the tubes eliminates the extra step of deploying concrete blocks onsite, saving time and money. In one or more embodiments, the telescoping arched tubes 16 described above may be in the form of hollow tubes with internal central cavities that are filled with sand, gravel, or a combination thereof.

Figure 47:
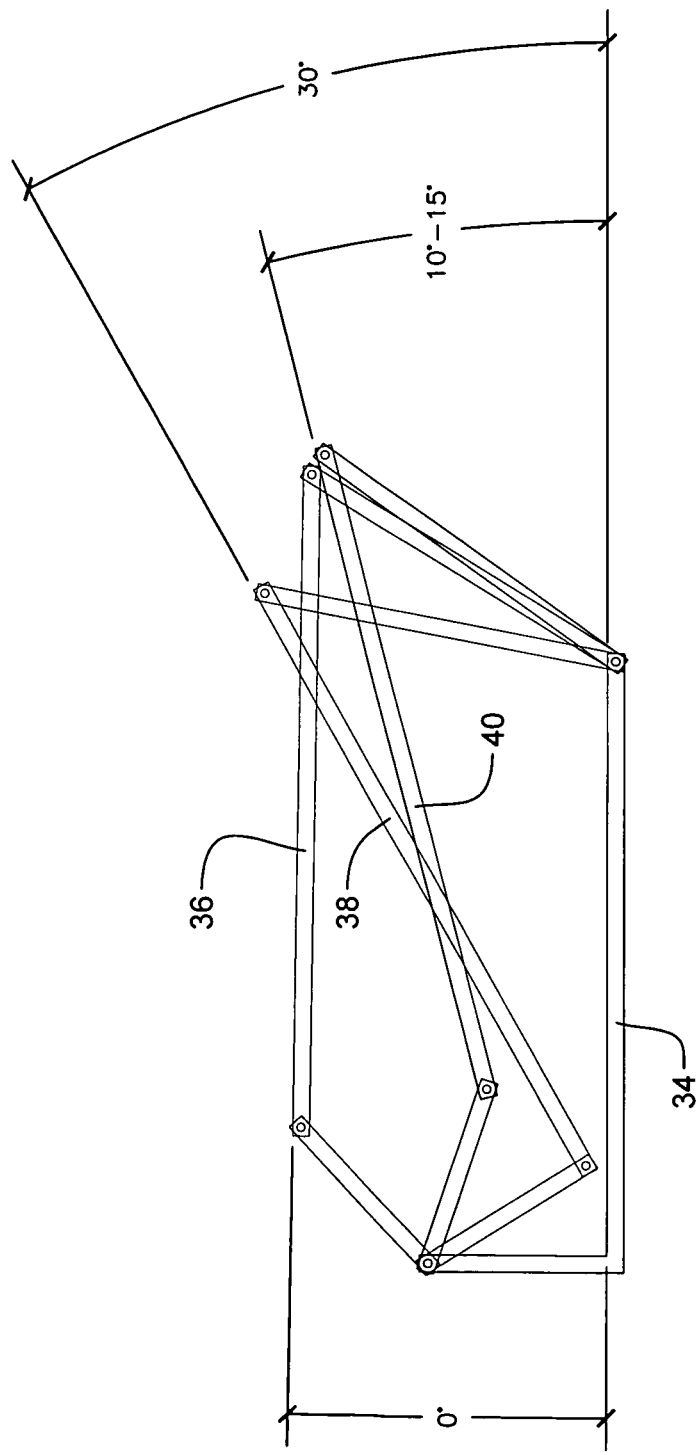
FIG. 47 is a side view of a linking system with passive means for tilting or rotating a photovoltaic module in an array, according to an illustrative embodiment of the invention.

Referring now to FIG. 47, an illustrative embodiment of a linking system 34 is shown that comprises passive means by which to tilt or rotate a photovoltaic module in an array. Using the linking system of FIG. 47, similar to a leaf on a tree yielding in a wind event to equalize pressure, the solar mounting systems comprising one or more linkage systems 34 may passively allow module tilt to change based on wind pressure. In a high wind event, the top of the module experiences negative pressures relative to the lower surface. In the linkage system 34 shown in FIG. 47, this pressure difference results in a negative force that pulls the module away from its steady state position, pulling it off the roof to allow for pressure equalization and a generally flat orientation to reduce the negative pressures by improving aerodynamics. That is, in the position 36 of FIG. 47, the photovoltaic module is tilted at an approximately 0 degree angle in order to relieve wind uplift pressure. That is, the rotatable ones of the linkage support members in the system 34 of FIG. 47 are configured to decrease the module tilt angle in response to the wind forces so as to reduce a wind load on the photovoltaic module. In a high snow event, the system 34 may increase the module tilt to shed snow, and bounce back to steady state once the snow is off, similar to how a pine tree sheds snow. That is, in the position 38 of FIG. 47, the photovoltaic module is tilted at an approximately 30 degree angle in order to shed snow under downward snow weight. In the relaxed position 40 of FIG. 47, the photovoltaic module is tilted an angle of approximately 10 to 15 degrees.

As such, the linkage system 34 of FIG. 47 illustrates the manner in which a photovoltaic module may passively adjust to wind and snow loads. In one or more other embodiments, these linkages may be in the form of leaf springs. In one or more embodiments, the negative pressure created by the wind creates an uplift force on the photovoltaic module just enough to relieve the pressure differential. In these embodiments, strong winds may raise the panel high enough off the roof surface to relieve the pressure and orient the module in a more aerodynamic position (i.e., position 36 in FIG. 47). When the wind stops, the module will return to its natural state which may be approximately a 10 degree tilt (i.e., position 40 in FIG. 47). In one or more embodiments, stops may be used in the system 34 to prevent over extension.

In one or more embodiments, snow load causes a downward force on the system 34 of FIG. 47 so that the photovoltaic module drops down into a steeper module tilt angle, which facilitates the shedding of snow off the south edge of the module. Again, in one or more embodiments, stops may be incorporated into the system 34 to prevent over extension. The steeper angle created when snow load drops the photovoltaic module also increases the rate at which the snow will melt because this angle will catch more winter sun. Once the snow melts, the module will return to its standard state (i.e., position 40 in FIG. 47).

In one or more embodiments, the photovoltaic module passive tilting system may be independent, wherein each module moves independently. Alternatively, the photovoltaic modules may be interconnected in various degrees. The photovoltaic module passive tilting system may be configured such that all the modules move together, or they all move independently, or that some modules in the array move independently and other modules in the array move together. For example, all photovoltaic modules in the array may move together to a certain degree, while individual modules in the array, which receive a higher wind or snow load, may move more than some of the other modules in the array.

Figure 48:
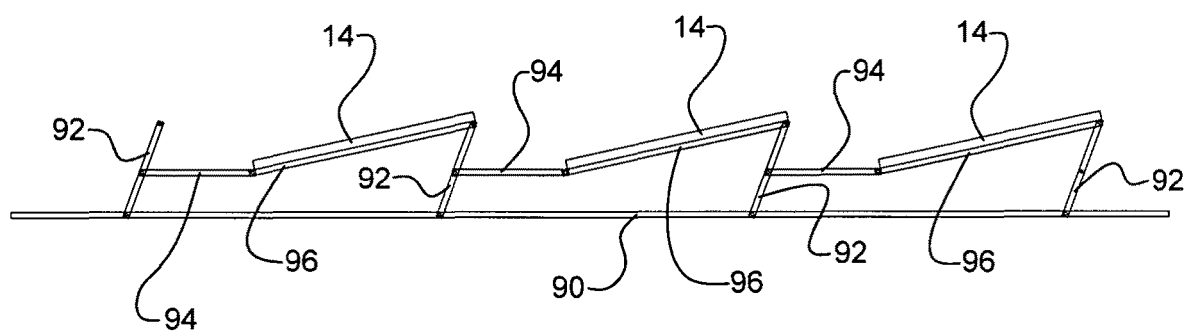
FIG. 48 is a side view of a plurality of photovoltaic modules using passive linkage means for tilting or rotating the photovoltaic modules, according to another illustrative embodiment of the invention, wherein the photovoltaic modules are illustrated in their unloaded states.
Figure 49:
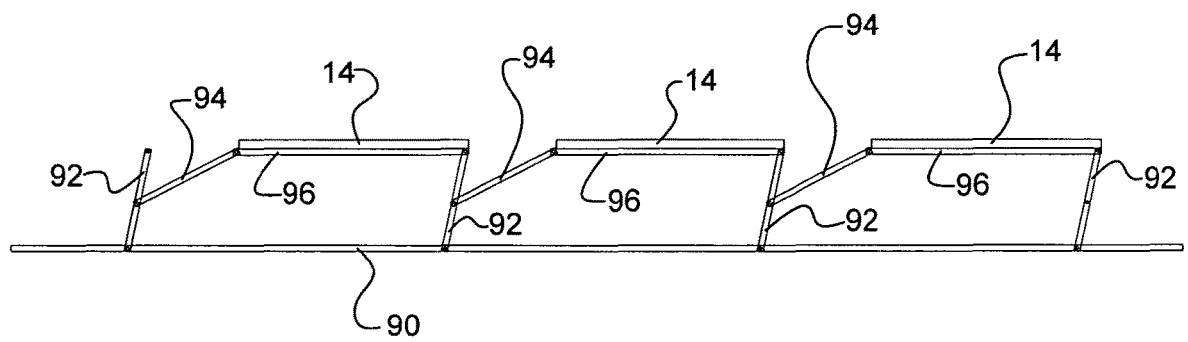
FIG. 49 is another side view of the plurality of photovoltaic modules using the passive linkage means of FIG. 48, wherein the photovoltaic modules are illustrated in one of their loaded states (e.g., when a wind load is acting thereon)

Now, with reference to FIGS. 48 and 49, an exemplary photovoltaic array utilizing the passive tilting system will be described. As shown in these figures, the passive tilting system comprises a stationary base linkage member 90 disposed beneath the photovoltaic modules 14. The base linkage member 90 remains stationary, and does not rotate when wind and snow loads are acting on the modules 14. Referring again to FIGS. 48 and 49, it can be seen that the passive tilting system further comprises a plurality of upright linkage members 92 that elevate the photovoltaic modules 14 above the stationary base link 90. The upright linkage members 92 undergo slight rotation when wind and snow loads are acting on the modules 14 (i.e., as shown in the positions of the linkage members 92 in FIG. 48, as compared to their positions in FIG. 49). The photovoltaic modules 14 are rotatably coupled to the upright linkage members 92 by module linkage members 94, 96. Each of the first module linkage members 94 are disposed in front of a respective module 14, while each of the second module linkage members 96 are disposed underneath a respective module 14 (i.e., the modules 14 are mounted on the linkage members 96). In one or more embodiments, each of the linkage members 90, 92, 94, 96 may be provided in pairs (i.e., on each side of the modules 14). In FIG. 48, the photovoltaic modules 14 are illustrated in their relaxed positions with no load acting thereon (e.g., each photovoltaic module 14 is tilted an angle of approximately 10 to 15 degrees). In FIG. 49, the photovoltaic modules 14 are illustrated in exemplary wind loaded positions (i.e., each photovoltaic module 14 is tilted at an approximately 0 degree angle in order to relieve wind uplift pressure). While the photovoltaic modules 14 illustrated in FIGS. 48 and 49 are disposed in generally the same loaded and unloaded positions, it is to be understood that, in other embodiments, the individual photovoltaic modules 14 in the array may assume loaded and unloaded positions that are different from one another.

Figure 50:
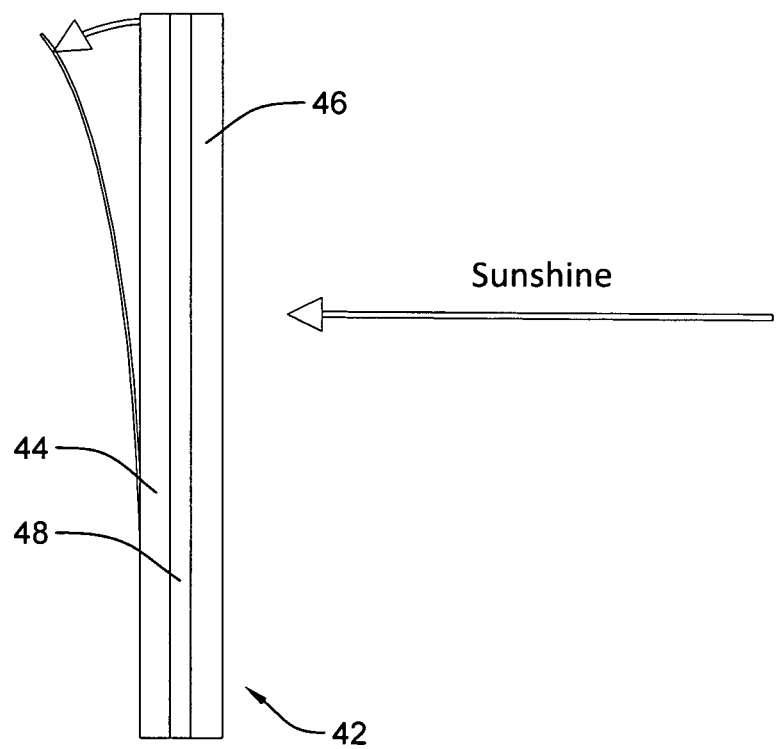
FIG. 50 is a side view of a photovoltaic module mounting structure in the form of a beam for providing passive solar tracking that tilts or rotates a photovoltaic module in an array.

Turning next to FIG. 50, an illustrative embodiment of a passive solar tracking means by which to tilt or rotate a photovoltaic module in an array is shown. The embodiment of FIG. 50, like prehistoric solar collectors (i.e., leaves), is capable of turning toward the sun without employing complicated control systems that are prone to failure. Also, the embodiment of FIG. 50 does not include moving parts that require maintenance. As shown in FIG. 50, the photovoltaic mounting structure may be in the form of a beam 42 that is comprised of two different sheets 44, 46 adhered together with a central insulation sheet 48, each outside material 44, 46 having the same known thermal coefficient of expansion/contraction. When the sun strikes one side (e.g., sheet 46 in FIG. 50) and heats it, the beam 42 bends due to thermal expansion on that side. With the appropriate linkage members in the mounting system, the bend in the beam 42 is capable of tilting the photovoltaic module or panel towards the sun passively.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A mounting system for supporting a plurality of photovoltaic modules on a support surface, said mounting system comprising:
   a plurality of telescoping tubular members configured to support one or more photovoltaic modules on a support surface, said plurality of telescoping tubular members configured to be adjustably attached to one another so as to accommodate undulations and uneven regions of said support surface, and at least one of said plurality of telescoping tubular members comprising an arched portion so as to accommodate thermal expansion and contraction;
   wherein a first portion of said plurality of telescoping tubular members extend in a generally north-south direction of said one or more photovoltaic modules; and
   wherein a second portion of said plurality of telescoping tubular members extend in a generally east-west direction of said one or more photovoltaic modules, each of said first and second portions of said plurality of telescoping tubular members including one or more of said arched portions for accommodating thermal expansion and contraction.

2. The mounting system according to claim 1, wherein at least some of said plurality of telescoping tubular members are configured to attach to mounting holes in said one or more photovoltaic modules, or said at least some of said plurality of telescoping tubular members use one or more clamp members that are capable of being attached anywhere along a peripheral edge of said one or more photovoltaic modules.

3. The mounting system according to claim 1, wherein one or more of said plurality of telescoping tubular members further comprise a standoff member disposed on a north end of said telescoping tubular member for creating a tilt angle of said one or more photovoltaic modules.

4. The mounting system according to claim 1, further comprising one or more wind deflector members configured to deflect wind up and over said one or more photovoltaic modules rather than under said one or more photovoltaic modules to reduce wind load.

5. The mounting system according to claim 4, wherein at least one wind deflector section of said one or more wind deflector members comprises one or more elongate slots and/or a narrowed end portion at a connection location to an adjoining wind deflector section so as to accommodate said undulations and said uneven regions of said support surface and said thermal expansion and contraction.

6. The mounting system according to claim 1, wherein each of said plurality of telescoping tubular members comprises an internal cavity disposed therein, one or more of said plurality of telescoping tubular members comprising a ballasting material disposed in said internal cavity thereof for ballasting said one or more photovoltaic modules on said support surface.

7. The mounting system according to claim 6, wherein said ballasting material comprises at least one of: (i) sand and (ii) gravel.

8. The mounting system according to claim 6, wherein said one or more of said plurality of telescoping tubular members are prefilled with said ballasting material prior to being installed in place on said support surface.

* * * * *